(12) United States Patent
Adams et al.

(10) Patent No.: US 7,489,444 B1
(45) Date of Patent: Feb. 10, 2009

(54) PORTABLE FRONT PROJECTION SCREEN ASSEMBLIES WITH FLEXIBLE SCREENS

(75) Inventors: Douglas Adams, Raleigh, NC (US);
Robert L. Wood, Cary, NC (US);
Edward Fadel, Hillsborough, NC (US);
Donald Hirsh, Chapel Hill, NC (US);
Sean Hillard, Raleigh, NC (US)

(73) Assignee: Bright View Technologies, Inc., Morrisville, NC (US)

( * ) Notice: Subject to any disclaimer, the term of this patent is extended or adjusted under 35 U.S.C. 154(b) by 0 days.

(21) Appl. No.: 11/961,364

(22) Filed: Dec. 20, 2007

Related U.S. Application Data

(60) Provisional application No. 60/981,139, filed on Oct. 19, 2007.

(51) Int. Cl.
*G03B 21/60* (2006.01)
(52) U.S. Cl. ..................................... 359/461
(58) Field of Classification Search ................. 359/461
See application file for complete search history.

(56) References Cited

U.S. PATENT DOCUMENTS

| | | | |
|---|---|---|---|
| 6,249,377 B1 * | 6/2001 | Takamoto et al. | 359/461 |
| 6,424,463 B1 * | 7/2002 | Nishitani | 359/449 |
| D520,046 S | 5/2006 | Miyagawa et al. | |
| 7,092,166 B1 | 8/2006 | Wood | |
| 7,192,692 B2 | 3/2007 | Wood et al. | |
| D548,765 S | 8/2007 | Kotera et al. | |
| 7,262,912 B2 | 8/2007 | Wood | |
| 2007/0121088 A1 | 5/2007 | Liang et al. | |
| 2007/0121209 A1 * | 5/2007 | Liang et al. | 359/461 |

FOREIGN PATENT DOCUMENTS

| TW | 553683 | 9/2003 |
|---|---|---|
| TW | D112308 | 8/2006 |

OTHER PUBLICATIONS

Search Report for New design Patent Application, ROC (Taiwan) New Design Patent Application No. 096306328 (with Translation), Date of Completion May 16, 2008.
Search Report for New design Patent Application, ROC (Taiwan) New Design Patent Application No. 096306329 (with Translation), Date of Completion May 16, 2008.
U.S. Appl. No. 29/297,173, filed Nov. 16, 2007, Douglas Adams et al.

* cited by examiner

*Primary Examiner*—Christopher Mahoney
(74) *Attorney, Agent, or Firm*—Myers, Bigel, Sibley & Sajovec, P.A.

(57) ABSTRACT

Portable projection screen assemblies include a case comprising a flexible projector screen held on a roller, the screen has a high ARR and a high-gain and can be adapted for use in uncontrolled indoor ambient lighting conditions. The case is configured with releasably matable first and second housing members and a slidably collapsible frame that slides open in a side-to-side orientation and unrolls the projector screen to at least one predetermined viewing configuration and closes together to encase the screen and frame therein. The projector screens may be particularly suitable for use with low-lumen projectors.

23 Claims, 22 Drawing Sheets

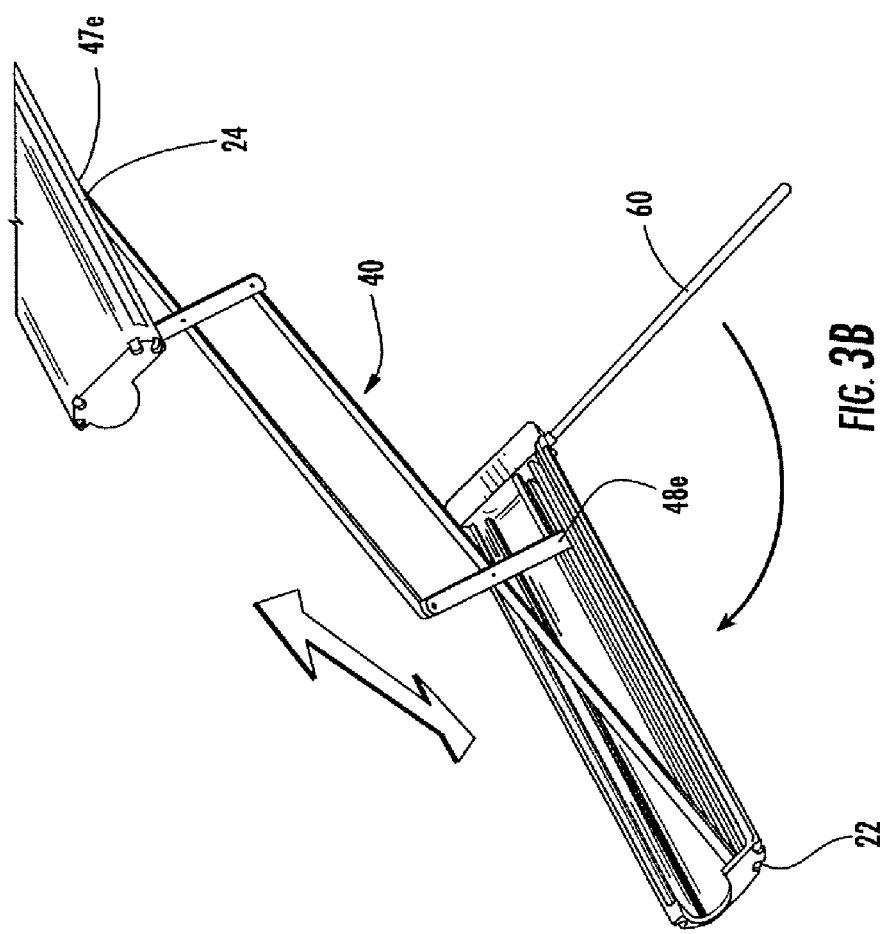

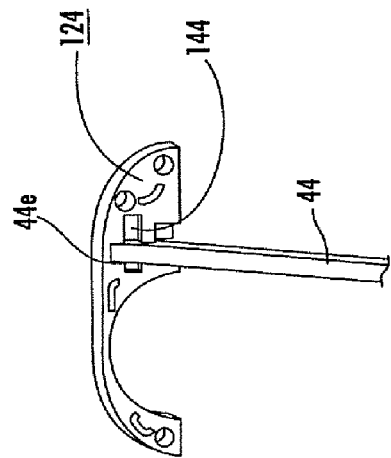
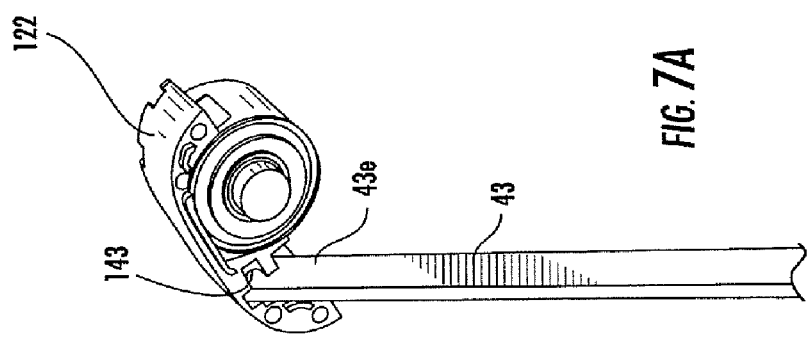
FIG. 7B
FIG. 7A

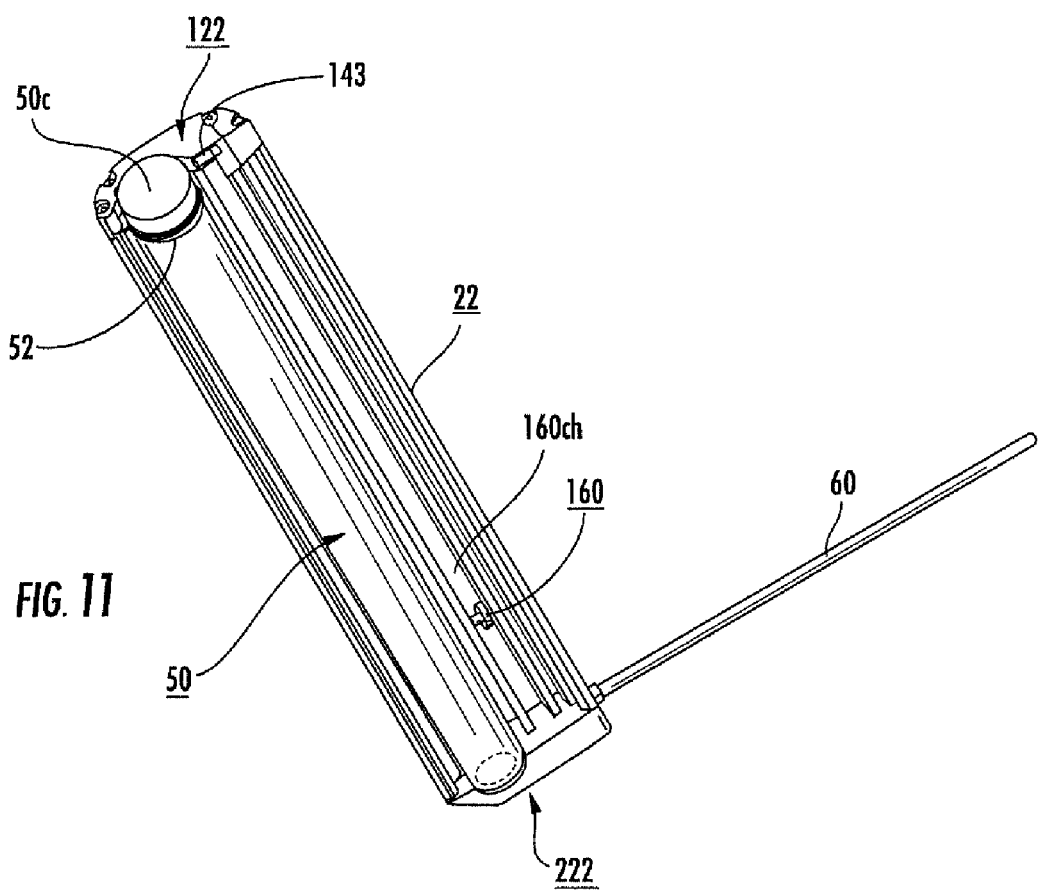

DIFFUSE REFLECTANCE AMBIENT (DA)
1) MEASURE ILLUMINANCE - REFLECTANCE STANDARD ($L_{rs}$)
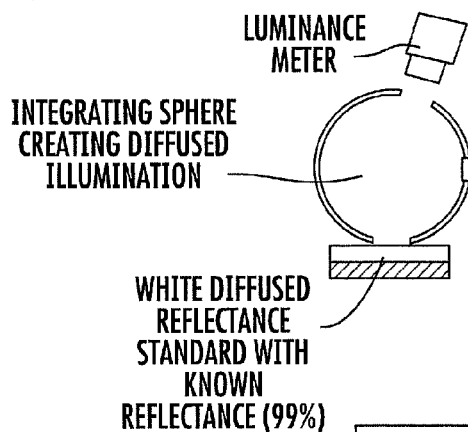
2) MEASURE REFLECTION FROM SUT ($L_s$)
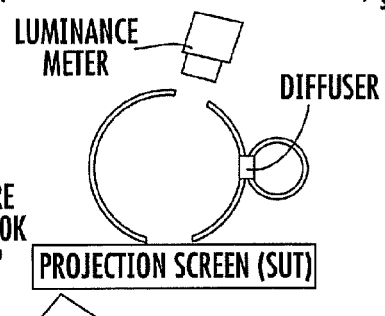
3) OBTAIN DIFFUSE REFLECTANCE AMBIENT DA = $L_s/L_{rs}$
FIG. 18A
DIFFUSE REFLECTANCE SOURCE (DS)
1) MEASURE ILLUMINANCE - REFLECTANCE STANDARD ($I_{rs}$)
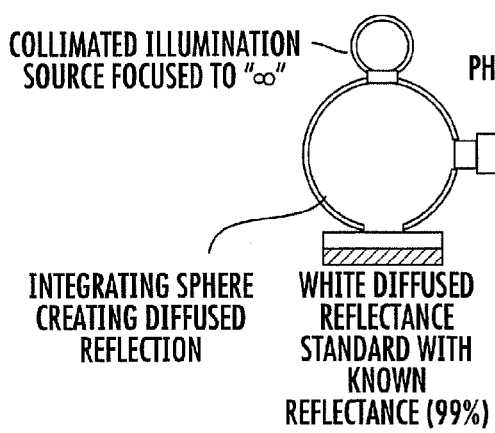
2) MEASURE ILLUMINANCE FROM SUT ($I_s$)
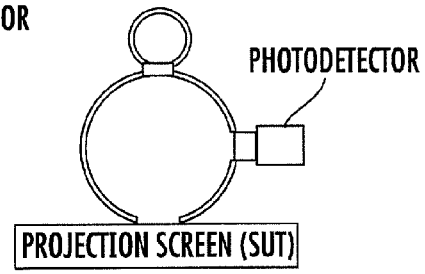
3) OBTAIN DIFFUSE REFLECTANCE SOURCE DS = $I_s/I_{rs}$
FIG. 18B

PORTABLE FRONT PROJECTION SCREEN ASSEMBLIES WITH FLEXIBLE SCREENS

RELATED APPLICATION

This application claims the benefit of priority of U.S. Provisional Application Ser. No. 60/981,139, filed Oct. 19, 2007, the contents of which are hereby incorporated by reference as if recited in full herein.

FIELD OF THE INVENTION

This invention relates to front projection systems and particularly to front projection screens where the projector and viewer(s) are on the same side of the projection screen.

BACKGROUND OF THE INVENTION

Video projectors, used in conjunction with front projection screens (also referred to as reflective- or reflection-type projection screens), are a popular way to display video and computer imagery, and are commonly used in cinemas, home theaters and other consumer and commercial applications.

Front projection screens that are used in cinema or home theater applications generally are viewed in controlled illumination settings such as dark or subdued lighting conditions including, for example, windowless corporate meeting rooms, dedicated commercial or home theater installations and the like. In such controlled and/or dark room conditions, a suitably placed front projection screen, typically constructed with a matte white vinyl viewing surface, can deliver a sufficient and even superior viewing experience of the projected image.

With recent advances in reduced-cost, light-weight projectors, more users deploy projection systems in uncontrolled lighting. However, many commercially available screens lack an ability to effectively reduce or otherwise mitigate reflections of ambient illumination. Ambient illumination striking the projection screen surface produces a loss of contrast, and viewers perceive the image to be washed out in brightly lit settings. This is especially noticeable with mid- and/or lower-luminance projectors. However, in some situations, such as business meetings, lectures or other educational events, or in personal uses like multi-player or single player on-screen gaming and/or portable theater, it may be desirable to use projection devices in high-ambient or uncontrolled lighting situations. Coupled with the advances in portable projectors there is an emerging need for portable projection screens for use in mixed-light and/or environments with uncontrolled ambient illumination.

SUMMARY OF EMBODIMENTS OF THE INVENTION

Embodiments of the invention are directed to projection screen assemblies and/or systems that may be particularly suitable for use in mixed light conditions.

In some embodiments, the projection screen assemblies include: (a) a first housing member comprising a roller oriented in a substantially vertical orientation in the first housing member; (b) a flexible projection screen with both a high gain and an appropriately high Ambient Rejection Ratio (ARR), with the screen configured to laterally roll on and unroll from the roller (in a side-to side orientation); (c) a second housing member attached to one vertically extending perimeter portion of the projection screen and releasably matably attached to the first housing member; and (d) a collapsible frame attached to the first and second housing members whereby the first and second housing members and the frame laterally slide between a closed storage configuration and at least one open viewing configuration. In the storage configuration, the projection screen is wound on the roller and the first and second members are closed together with the frame collapsed and held therebetween. In the at least one open viewing configuration, the first and second housing members are laterally spaced apart with the projection screen and frame extending therebetween and the frame residing behind the projection screen.

In some embodiments, the assemblies are adapted for portable projection systems used in uncontrolled ambient lighting conditions.

Other embodiments are directed to ceiling or wall mountable projection screen assemblies. The screen assemblies include: (a) a first housing member comprising a take-up reel oriented in a substantially vertical orientation in the first housing member; (b) a flexible projection screen with a high Ambient Rejection Ratio (ARR) (and typically also a high gain), the projection screen having opposing first and second laterally spaced apart end portions with the first end portion engaging the take-up reel, with the screen is configured to roll on and unroll in a side-to side orientation from the take-up reel; (c) a second housing member attached to the second end portion of the projection screen; and (d) a collapsible frame attached to the first and second housing members whereby the first and second housing members laterally slide between a closed storage configuration and at least one open viewing configuration. In the storage configuration, the projection screen is wound on the take-up reel in the first member and the first and second members are closed together with the frame collapsed and held therebetween. In the at least one open viewing configuration, the first and second housing members are laterally spaced apart with the projection screen extending therebetween and the frame residing behind the projection screen.

Other embodiments are directed to portable projection screen systems that include: (a) a low-lumen projector; and (b) a case comprising a flexible projector screen held on a roller, the screen having a high ARR (and optionally high-gain) and being adapted for use in uncontrolled indoor ambient lighting conditions. The case is configured with releasably matable first and second housing members and a slidably collapsible frame that extends therebetween, wherein the first and second housing members and frame slide apart to open in a side-to-side orientation whereby the projector screen automatically unrolls with the movement of the frame and at least one of the first and second housing members to at least one predetermined viewing configuration, and wherein the first and second housing members and slidably collapsible frame and slidably close together whereby the projector screen is automatically rolled on to the roller and the first and second members hold the screen and frame therebetween.

In some embodiments, the portable projection screens can be compact and have a low profile, and the screen can be a high-contrast screen for use in ambient illumination with a two-position viewing configuration, providing 4:3 and 16:9 aspect ratios respectively.

BRIEF DESCRIPTION OF THE DRAWINGS

FIG. 3B is a partial end side perspective view of the screen assembly of FIG. 1 shown without the screen according to exemplary embodiments of the present invention.

FIG. 7A is a partial side perspective view of an upper end cap assembly (roller side) with a pivotably mounted frame link according to exemplary embodiments of the present invention.

FIG. 7B is a partial end perspective view of the other upper end cap assembly with a pivotably mounted frame link according to exemplary embodiments of the present invention.

FIG. 11 is a front side perspective view of the roller-side housing shown without the frame and with certain components being transparent.

FIGS. 18A and 18B are schematic illustrations of procedures for evaluating the Ambient Rejection Ratio (ARR) of a screen.

DETAILED DESCRIPTION

Figure 1:
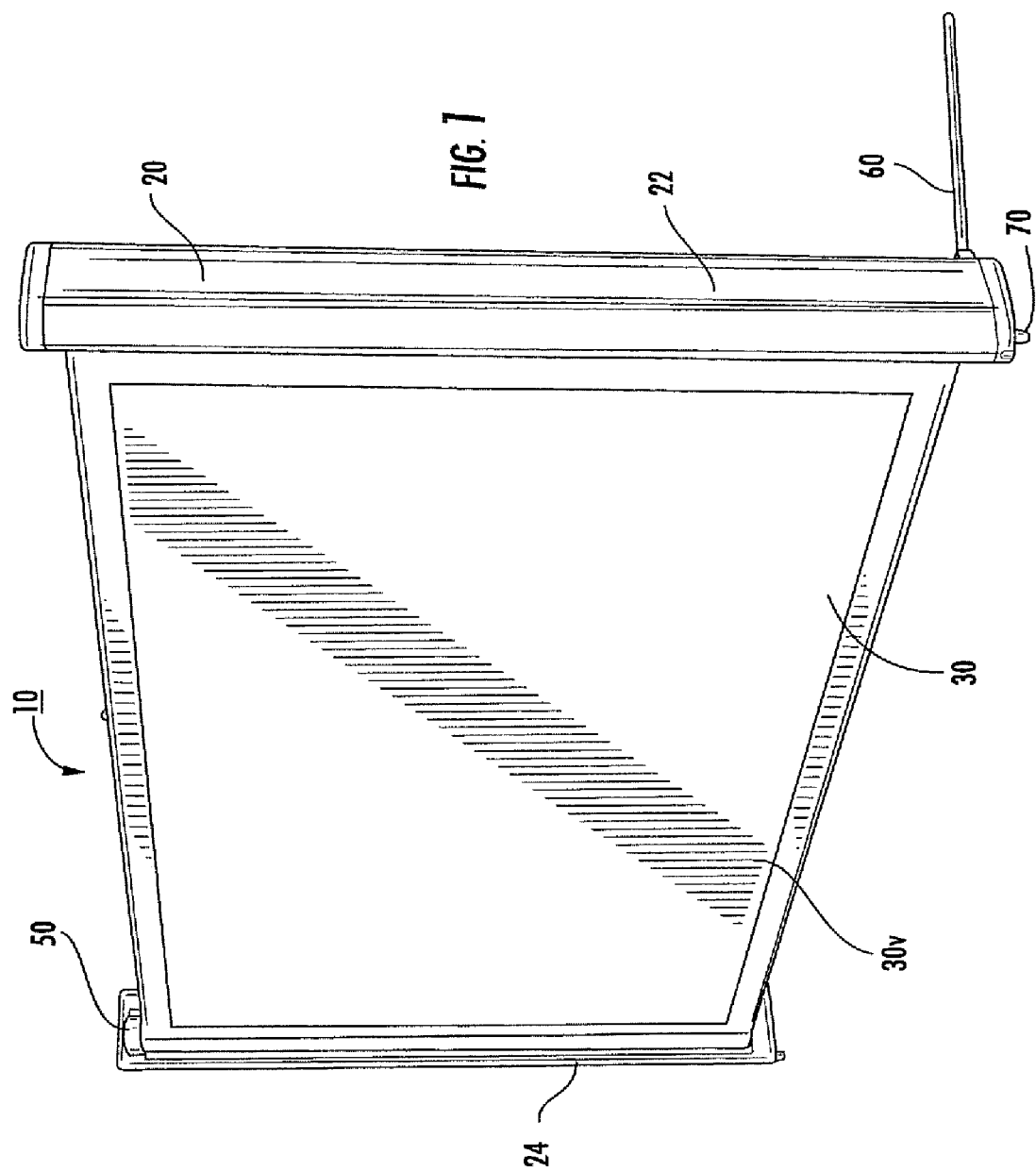
FIG. 1 is a front perspective view of a front projection screen assembly according to exemplary embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, materials, regions, layers and/or sections should not be limited by these terms. These terms are only used to distinguish one element, material, region, layer or section from another element, material, region, layer or section. Thus, a first element, material, region, layer or section discussed below could be termed a second element, material, region, layer or section without departing from the teachings of the present invention. In particular, as used herein, the relative terms "first direction" and "second direction" mean two different, not necessarily orthogonal, directions, whereas the terms "horizontal" and "vertical" indicate specific orientations based upon the ultimate orientation of the projection screen. Moreover, the terms "front" and "back" are used herein to describe opposing outward faces of a front projection screen. Conventionally, the viewing face is deemed the front.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Front projection systems rely on a projector which produces a generally high-intensity image which is focused and/or directed onto the projection screen. The reflected image from the screen is what viewers perceive. When the projected/reflected image is substantially brighter than the ambient surround viewers experience the image as being sufficiently bright. A number of terms are used to characterize the performance of the projection screen in a projection system.

The term "gain" is a dimensionless ratio of the measured luminance of a particular screen (the numerator), measured on-axis, to the luminance of a white diffuse standard (Lambertian white reflector) (the denominator) under identical, substantially collimated illumination. Conventional projection screens have gains ranging from 0.9 to 2.5. The term "high-gain" refers to a screen with a gain of 3.0 or higher. In some embodiments, some high-gain screens can have a gain that is between about 4-10 (or even greater), including, for example, between about 6-8. High gain can be an important attribute for screens used with low-luminance projectors because a high gain screen allows a low luminance projector to create a bright image with a luminous flux equivalent to a much brighter projector being used with a conventional projection screen.

The term "half-angle" refers to the measure or angle from normal to the front face of the projection screen where the intensity of reflected illumination is half the intensity of its maximum on-axis intensity. Depending on the construction of the projection screen, half-angles may be symmetric or asymmetric. Half-angle is an objective measure of field-of-view for a particular screen, which is a proportional measure of how far a viewer may deviate from a centered, normal viewing of the projection screen.

In the present context, the term "high-contrast" describes an image projected and illuminated by the projection system which is characterized by a wide (optical) dynamic range and that ambient illumination which may strike the projection screen does not significantly diminish the dynamic range of the presented image.

The term "Ambient Rejection Ratio" (ARR) is a dimensionless number which gives an indication of the ability of the projection screen to discriminate in favor of reflecting projected images back toward a viewer(s) while efficiently shunting ambient reflected light away from the viewer(s). The ARR is the ratio of the diffuse-reflectance source (DS) to the diffuse reflectance-ambience (DA—both of these described and defined below), and is a convenient measure or figure of merit of how well the screen rejects ambient illumination. Most conventional front projection screens have an ARR between 0.98 and 1.15. The term "high" ARR refers to screens with an ARR of at least 1.20. A white Lambertian reflectance standard has an ARR of 1. A projection screen with an ARR of between about 1.3 and 1.6 generally shows a reasonable trade-off between an ability to partially reject ambient illumination and the on axis illumination of the projected image. Some embodiments are directed to high ARR projection screens with ARRs typically between about 1.25 and 2. Higher ARRs may be available in the future and high ARR screens contemplated for use with the present invention are not limited to the 1.25-2 ARR range. A projection screen with a high ARR allows for the projection screen to be particularly useful in mixed ambient lighting conditions because image contrast is better maintained when the artifacts of ambient illumination are diminished.

The term "diffuse reflectance-source" (DS) is a ratio that evaluates how efficiently the screen distributes a projected image back into ambient surround. This diffuse reflectance-source ratio is a dimensionless ratio of a luminance signal of the projection screen (numerator) divided by a luminance signal of a white standard (denominator). As with the gain measurement described above, the luminance signal is provided by substantially collimated illumination delivered to samples held in place at the sampling port of an integrating sphere and the signal is measured by a detector placed at an oblique angle from the source and screen.

The term "diffuse reflectance-ambient" (DA) is a ratio that evaluates how efficiently the screen distributes the ambient illumination back to the projection screen viewer. The diffuse reflectance-ambient ratio is a dimensionless ratio of the illuminance signal of the projection screen (numerator) divided by the illuminance signal of a white standard (denominator). The illuminance signal is delivered to samples held in place at the sampling port of an integrating sphere, where the illumination source is diffuse and oblique from the samples and the signal is measured by a detector placed normal to sample. FIGS. 18A and 18B schematically illustrate measurement procedures for the DS and DA ratios.

The terms "low-luminance" or "low lumen" refer to front projectors that have illumination at less than about 500 lumens or less, typically ranging between about 5-500 lumens. A "micro" projector is characterized by a small physical enclosure and has a luminous flux of 200 lumens or less. A subclass of the low lumen projectors is the "ultra-low-lumen" projectors, also known as the "picoprojectors" which are characterized by an extremely small enclosure (5-25 cubic centimeters) and a luminous output of between about 10-20 lumens or even less. Examples of low-power and/or low-luminance projectors include, but are not limited to, LED/DLP illuminated projector systems, which may be low-lumen, low power and light weight (typically about 5-10 pounds or even less). Recent examples of microprojectors include the LG Electronics HS-101, 100 lumen, LED/DLP-based projector and the Boxlight (Poulsbo, Wash.) Bumble-Bee, a LED/DLP, sub-100 lumen projector.

Different projectors and different viewing environments and/or applications may warrant projection screens with different screen characteristics (typically quantified in gain, half-angle, ARR) for maximal effectiveness. Screen production techniques such as those described in U.S. Pat. Nos. 7,092,166 B1 (Wood), 7,192,692 B2 (Wood et al.), and 7,262, 912 B2 (Wood II) provide a microlens-based design and implementation mechanisms in which all these attributes can be controlled and optimized in ways believed to have been previously unavailable to screen designers. The contents of these patents are hereby incorporated by reference as if recited in full herein.

The screens of the instant invention are particularly suitable for use with low-lumen and/or low-power and light-weight projectors in uncontrolled lighting conditions, e.g., mixed ambient lighting conditions, rather than controlled darkened (windowless) rooms, where there may be a need to create a bright image from low-power imaging source and to create a projection screen that can maximize the perceived contrast of the image in the uncontrolled environment.

Although the present embodiments are directed for use with low-lumen, lightweight projectors, the present invention is not limited thereto and the screens may also be used with mid or high-lumen outputs. The term "mid-lumen" refers to projectors with lumen outputs above 500 lumens and below about 3,000 lumens.

For some embodiments, which may be particularly suitable for use with ultra-low luminance projectors, e.g., sub-100 lumen projectors, the projection screen can have an ARR of at least about 1.4 and a high-gain luminance of about 6 or greater.

The projection screens of some embodiments of the invention may be particularly suitable as portable high-gain and high ARR screens for front projectors, including personal-use devices incorporating low-power projectors. Examples of such devices include pervasive computer devices with embedded projectors, such as microprojectors or picoprojectors, laptop computers, handheld computers, PDAs, multi or single player gaming devices and cellular telephones. The term "personal" with respect to a screen refers to a small-viewing area screen sized and configured for concurrent substantially on-axis viewing by the user and/or a small audience such as between about 1-6 persons.

Figure 2:
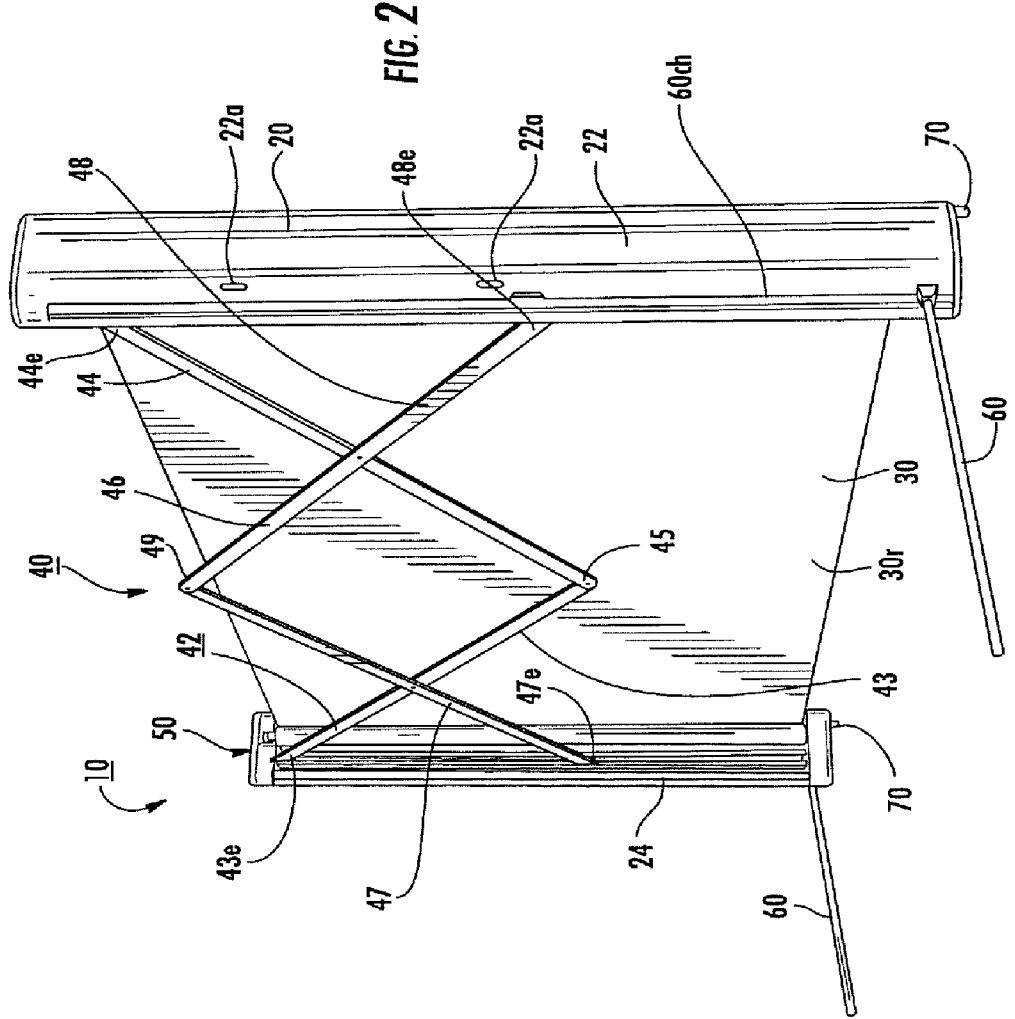
FIG. 2 is a rear perspective view of the front projection screen assembly of FIG. 1.
Figure 3A:
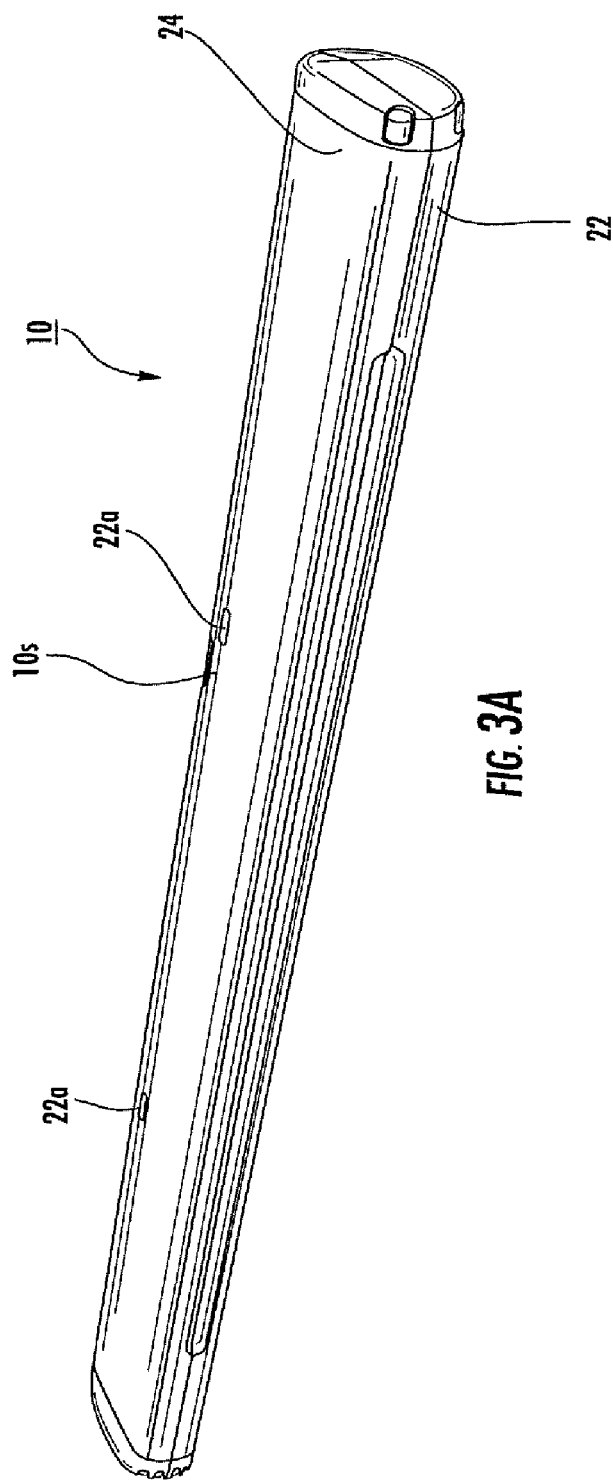
FIG. 3A is a side perspective view of the screen assembly shown in FIG. 1 shown in a collapsed compact storage configuration according to exemplary embodiments of the present invention.
Figure 5:
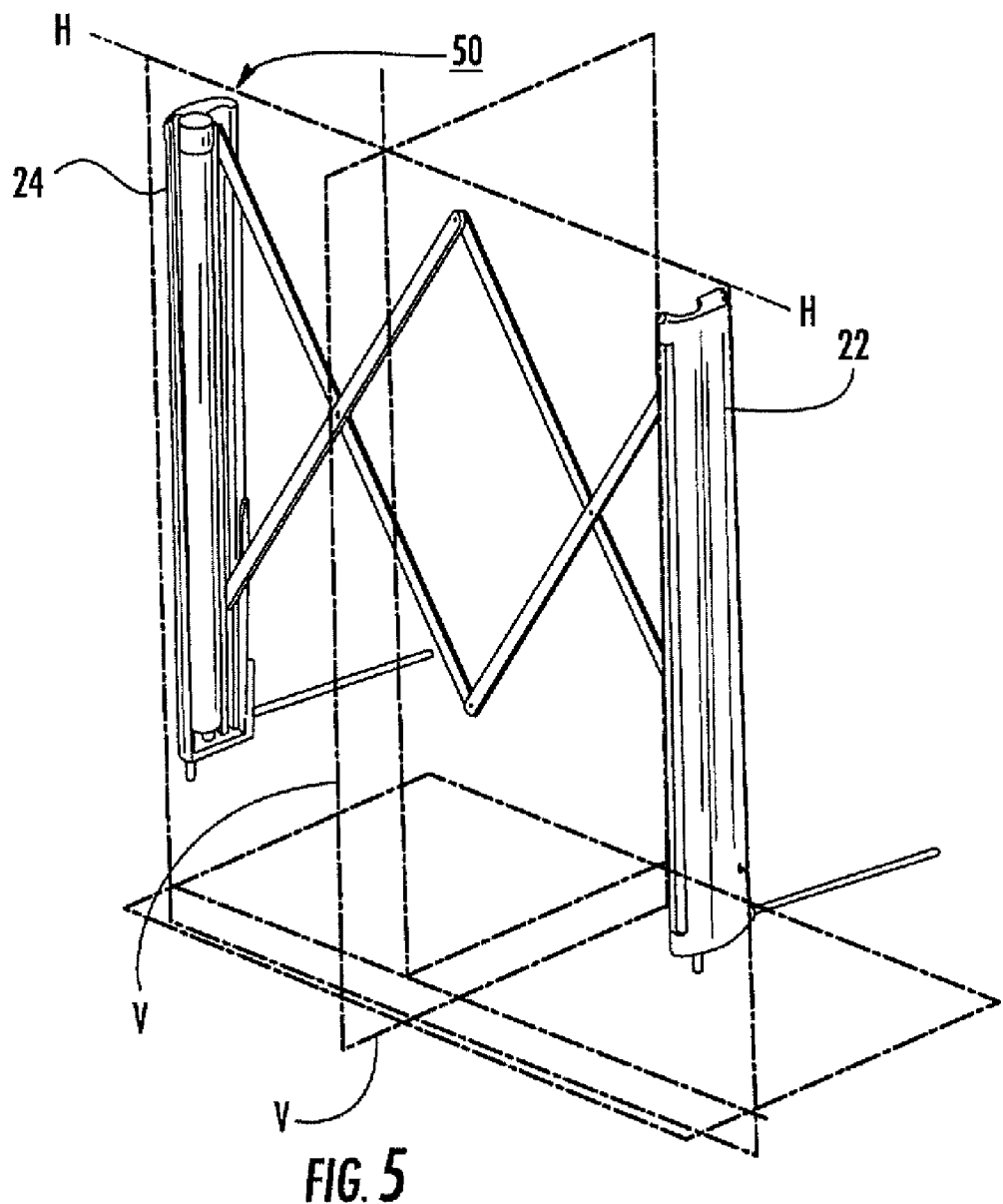
FIG. 5 is a front perspective view of the front projection screen assembly shown without the screen and with horizontal and vertical viewing axis according to embodiments of the present invention.

Referring now to the figures, FIGS. 1, 2, 3A and 3B, illustrate a projection screen assembly 10 with a collapsible housing 20 and a flexible projection screen 30 is shown. The projection screen 30 has a vertical axis "V" and a horizontal axis "H" (shown in FIG. 5 without the screen 30). Referring to FIG. 1, the projection screen 30 has a front viewing surface 30v, and as shown in FIG. 2, a rear surface 30r and frame 40, and can sit on a surface supported by legs 60 and feet 70. As is also shown, the screen assembly 10 has a housing 20 with a first member 22 and a matable second member 24. One of the members 22, 24 (shown as the left side member 24) holds a roller 50 (e.g., a take-up reel) that can wind and unwind the projection screen 30 between a storage configuration (FIG. 3A) and at least one viewing configuration(s). The reel and/or roller 50 can be held in either housing member but in this embodiment is shown in the left hand housing member 24. The members 22, 24 cooperate to open side-to-side and hold the screen 30 laterally extended in tension. The first and second members 22, 24 can slide together to matably attach and/or close into a compact (portable) storage configuration 10s with the screen 30 encased therein as shown in FIG. 3A. FIG. 3B illustrates an exemplary complimentary matable outer "shell" configuration of the first and second members 22, 24 that can close together to encase the frame 40 and screen 30 therein. Elongate vertical channels in each of the first and second members can be sized and configured to receive and hold the collapsed links of the frame when the case is closed. FIG. 3B also illustrates (as indicated by the arrows) that the housing members 22, 24 and frame 40 cooperate to slidably open and close and that the support leg(s) 60 can also rotate to close compactly against the housing member body.

Figure 4A:
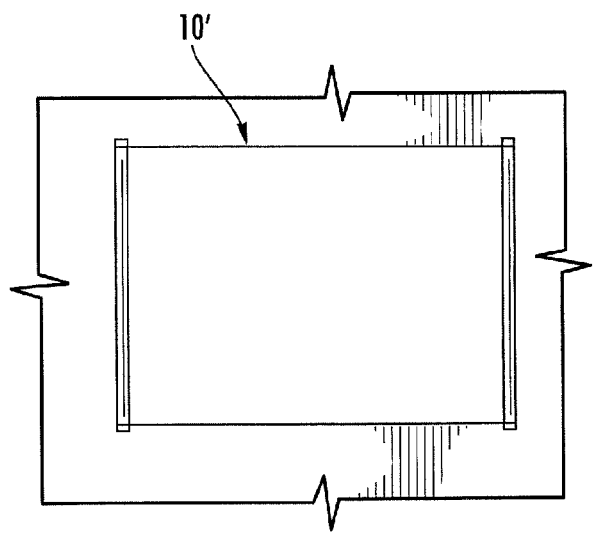
FIG. 4A is a front schematic illustration of a wall mountable front projection screen assembly according to exemplary embodiments of the present invention.
Figure 4B:
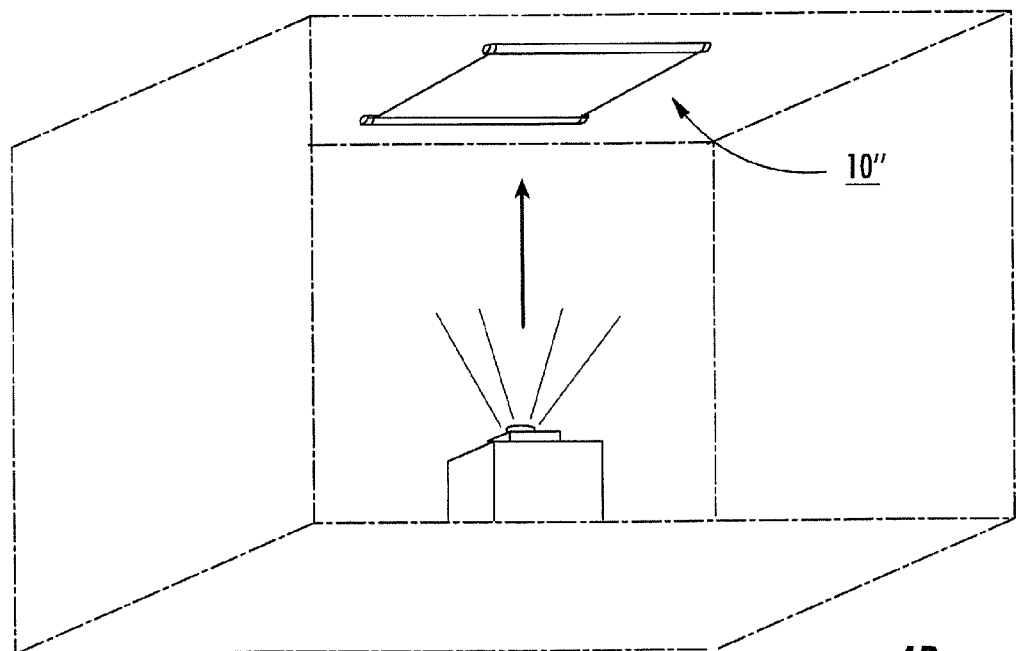
FIG. 4B is a schematic illustration of a ceiling mountable front projection screen assembly according to exemplary embodiments of the present invention.

The projector screen assembly 10 can be portable and sized to provide a projector screen 30 of between about 10-100 inches diagonal (when open), while collapsing to a compact, low-profile housing. For example, a 30-inch screen 30 can collapse to a 15 inch×2 inch×1 inch case and a 50-inch screen can collapse to a 24 inch×3 inch×1.5 inch case. As shown in FIGS. 4A and 4B, the assemblies 10', 10" can also be a wall-mountable or ceiling-mountable assembly, respectively, in which case the legs 60 and feet 70 are not required and the assembly 10', 10" can be modified with mounting hardware and brackets to allow the wall or ceiling mounting. The larger screens, e.g., above about 50 inches to about 100 inches diagonal, can also collapse to a compact configuration (for the 100 inch version, typically to about 48 inches×4 inches×4 inches). The ceiling or wall mountable screen assembly 10', 10" can be mounted so that the screen opens side-to-side or so that the screen opens top-to-bottom or bottom-to-top.

Portable screen assemblies 10 will typically be sized between about 10-50 inches diagonal, such as 30 inches and 50 inches diagonal. In some embodiments, the assembly 10 can have an ergonomic low-profile storage shape with a size that will fit into a briefcase, purse, backpack or other conventional carry or roller-based case. The casing or primary housing body can comprise a light-weight metal such as aluminum and/or polymer body. For the permanent or semi-permanent wall or ceiling mountable configurations 10', 10", larger screen sizes may be used, such as up to about 100 inches or even larger.

As also shown in FIGS. 1 and 2, the screen assembly 10 can include a frame 40 that automatically slidably extends and retracts responsive to a user's pulling the housing members 22, 24 open and pushing them closed, respectively. In some embodiments, each side of the assembly 10 includes a respective support leg 60 and a foot 70 that rests on a horizontal support surface. Each leg 60 can angle downwardly from a lower portion of the respective housing member 22, 24, and extend substantially normal to the screen 30 (in a direction away from the viewing surface 30v). As will be discussed further below, the legs 60 can be pivotably attached to the respective housing member 22, 24 and rotate upward to a closed position adjacent the outer surface of the respective housing. In some embodiments, as shown in FIG. 2, a leg 60 can reside in a vertical extending channel 60ch in the respective housing member 22, 24, when the assembly 10 is closed (FIG. 3). The housing members 22, 24 can slide together such that the two legs 60 reside adjacent but spaced apart from each other in the stored configuration.

Referring again to FIG. 2, the frame 40 can include two linkage pairs 42, 46. The first linkage pair 42 can include a first link 43 and a second link 44, with each link being pivotably attached to each other at one (inner) end portion at pivot 45. At the outer end portions 43e, 44e, each link 43, 44 is affixed to an upper end of the respective housing 24, 22. Similarly, the second linkage pair 46 includes a first link 47 and a second link 48, each also pivotably attached to each other at pivot 49 at a respective inner end portion. At the outer end portion 47e, 48e, each link 47, 48 is slidably attached to the respective housing 24, 22, as will be discussed further below, so that a user slides open the housing members 22, 24 and the frame 40 slidably laterally expands behind the screen 30. The first and second linkage pairs 42, 46 can define cooperating "scissors" or linkages that each, when extended, define a substantially "V" shape, with the vertex of one "V" oriented downward and the vertex of the other "V" oriented upward. The second linkage pair 46 can be configured to reside vertically under the screen height, or as shown in FIG. 2, the apex or upper edge of the links 47, 48 may reside above the screen 30. As shown in FIG. 2, the first linkage pair 42 can reside under the second linkage pair 46 and closer to the screen 30 that the second linkage pair 46. However, the configuration of the linkages can be reversed and/or other (skeletal) collapsible frame configurations may be used.

Figure 6:
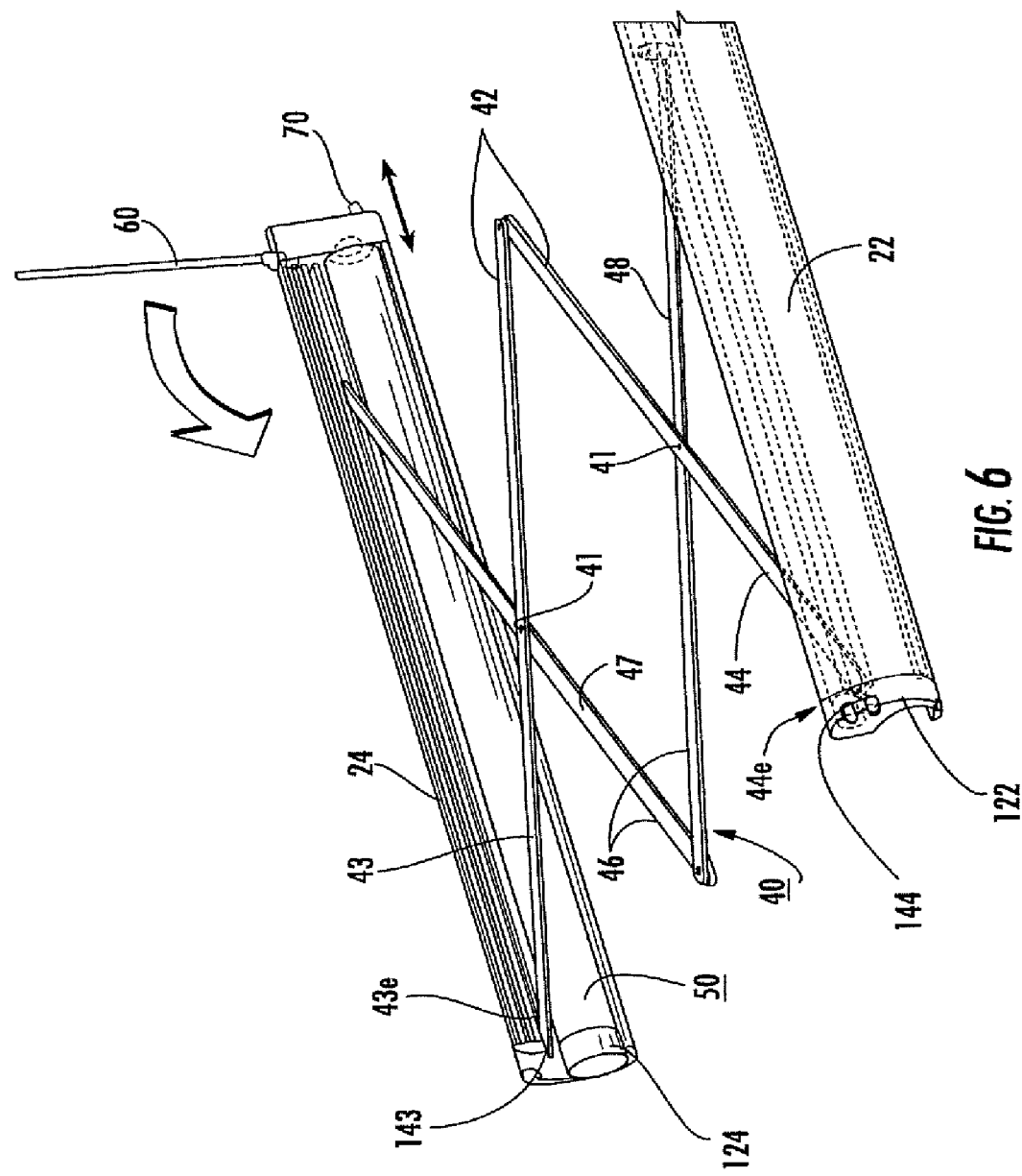
FIG. 6 is a partial rear side perspective view of the screen assembly shown in FIG. 1, shown with certain features being shown as transparent and the screen removed for clarity.

As shown in FIG. 6, the first linkage pair may 42 can optionally be pivotably attached to the second linkage pair 46. That is, as shown, each of the first links 43, 47 and each of the second links 46, 48 can be pivotably attached to each other at a pivot 41. The pivot 41 can be at a medial location of each link 44, 48 and 43, 47, respectively.

FIGS. 7A and 7B illustrate that each end portion 43e, 44e of the first linkage pair 42 can be attached to an end cap assembly 122, 124 via a pivot pin (or small link) 143, 144, respectively. As shown, the pivot pin 143, 144 can extend across a recess or channel in the housing and through the end portion of the respective linkage 43e, 44e to attach the pin to the corresponding housing 22, 24 and allow the pins 43, 44 to pivot. Each end cap assembly 122, 124, respectively, mates to an upper portion of the corresponding housing member body 22, 24.

The assembly 10 can be configured to slidably open to at least one predetermined viewing configuration with a desired aspect ratio. The assembly 10, 10', 10" can include a detent or stop that cooperates with one or more of the side (sliding) linkages 48 or 47 and automatically engages when a user slides the frame 40 open to a certain width. In some embodiments, the assembly 10 can include two user-releasable detents or stops that allow the screen 30 to translate to two different predetermined viewing configurations, each having a different aspect ratio. Any suitable stop mechanisms may be used such as, for example, slides with stroke limits, frictional passages, occlusion members in the housing sliding channels (160ch, 150ch, FIGS. 10A, 9C) and the like. The screen assemblies 10, 10', 10" can be configured to open to two aspect ratios, e.g., 4:3 and 16:9. The screen assemblies 10, 10', 10" can be configured to inhibit over-extension of the housing members 22, 24, frame 40 and/or screen 30 and/or to allow a user to slide the housing open to the first pre-determined position whereby further expansion of the screen 30 is stopped or inhibited.

Figure 8:
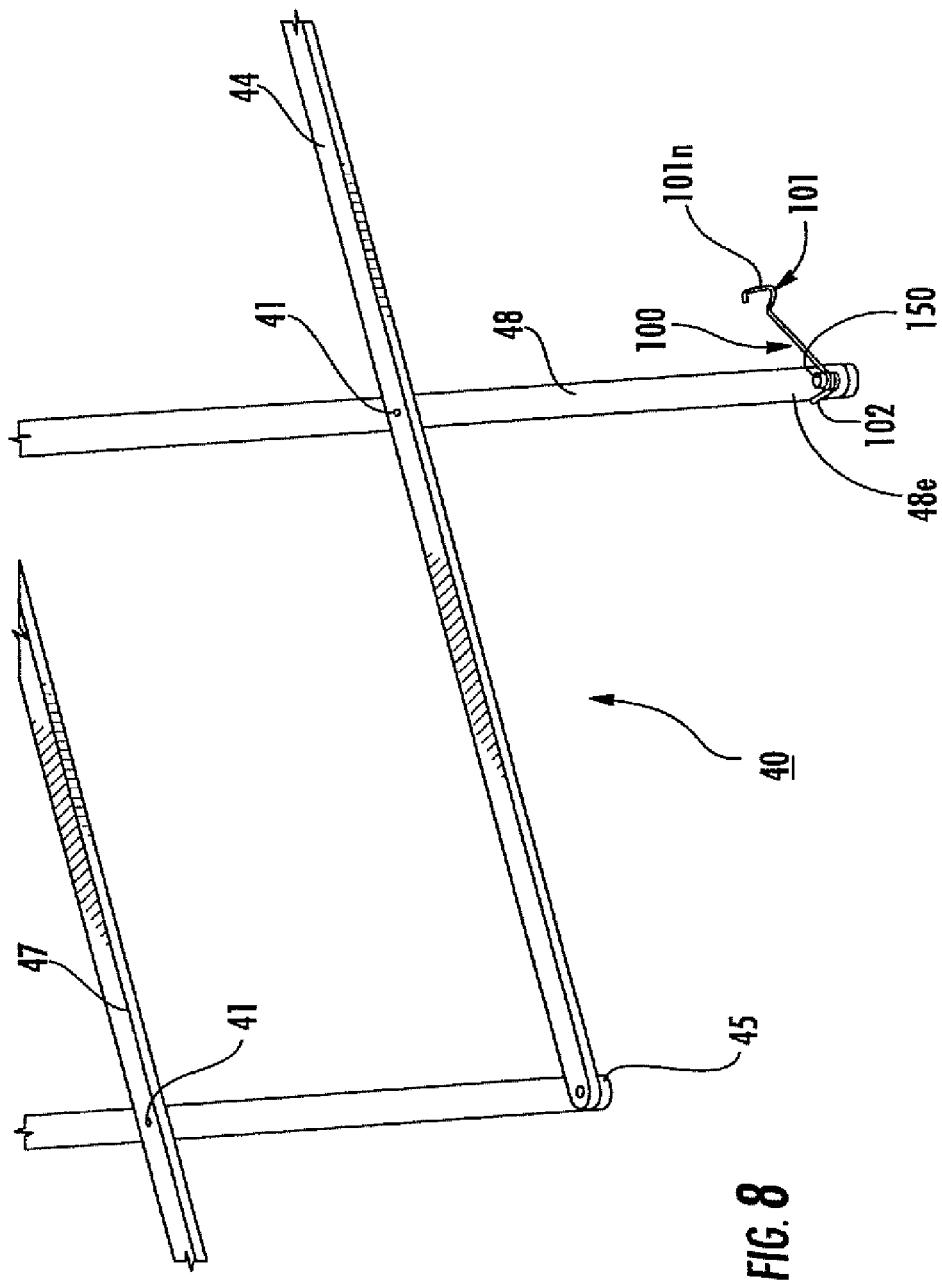
FIG. 8 is a partial top perspective view of the frame shown in FIG. 2 according to exemplary embodiments of the present invention.
Figure 9A:
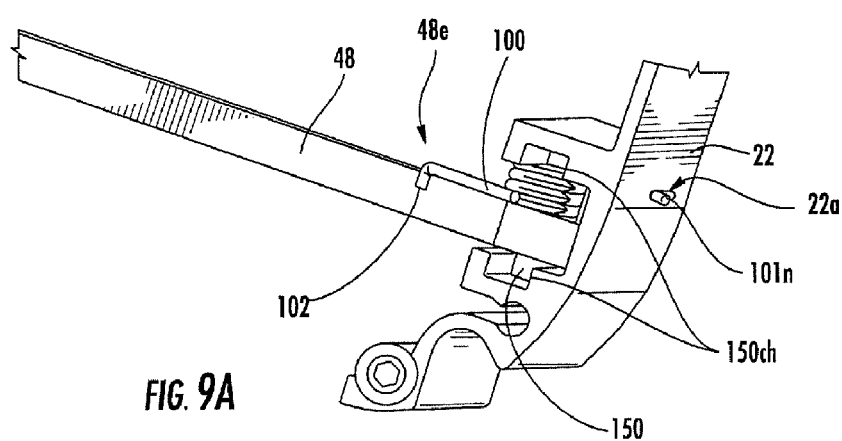
FIG. 9A is a partial cutaway side perspective view of a housing member with a sliding linkage mechanism according to exemplary embodiments of the present invention.
Figure 9B:
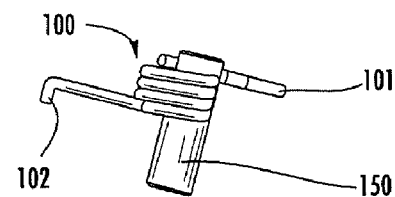
FIG. 9B is an enlarged side view of a sliding pivot pin and spring shown in FIG. 9A illustrated outside the housing body.
Figure 9C:
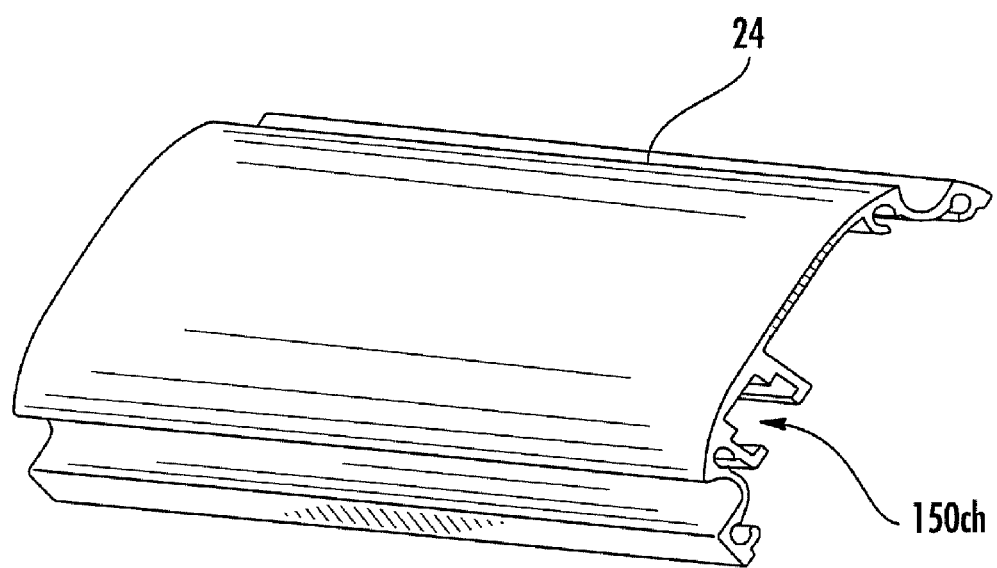
FIG. 9C is a partial side end perspective view of a housing member (non-roller side) according to exemplary embodiments of the present invention.

FIGS. 8, 9A and 9B illustrate one embodiment of a stop mechanism. FIG. 8 illustrates a portion of the frame 40. As shown, a sliding pin 150 can extend through an end portion 48e of the linkage 48. A spring 100 can also reside over the pin 150 with one end portion 102 affixed to the end portion of the linkage 48. The other end portion of the spring 101 can include an outwardly projecting node 101n. FIG. 9A is a partial cutaway view of the end portion of the link 48e in position in the housing member 22. FIG. 9B shows the pin 150 and spring 100 away from the link 48 and housing 22. The pin 150 extends upwardly and downwardly in a vertical channel 150ch in the housing member 22 that allows the pin 150 to slide vertically up and down to open or close the frame 40. The pin 150 also allows the link 48 to pivot as it moves up and down (to open and close). The spring 100 can be configured so that the lobe 101n extends out through a side aperture 22a located in the housing 22 when the pin 150 slides up to configure the screen 30 in a certain predetermined open "viewing" position. To release the screen 30 from this position, a user can depress the spring 101 inward, which allows the link 48 to continue moving upward (thereby widening the screen 30) or allows the link 48 to translate down as a user closes the frame and housing members 22, 24. The housing 22 can include a second aperture located vertically above the aperture 22a (not shown), which can position the screen at a second predetermined viewing configuration. FIG. 9C illustrates one embodiment of the housing 24.

Figures 10A, 10B:
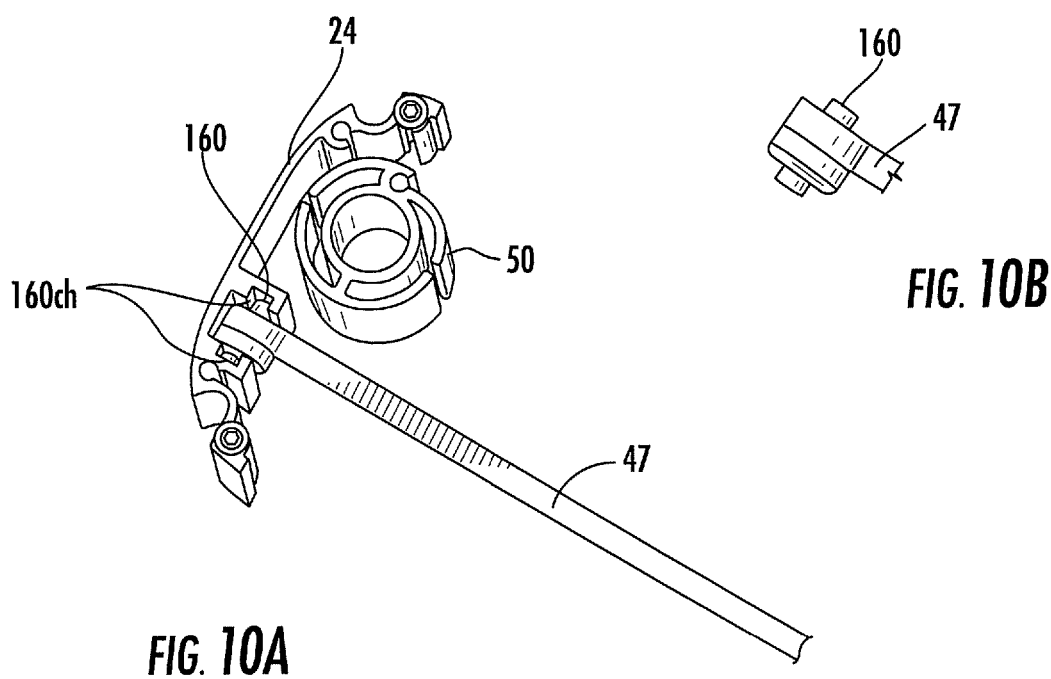
FIG. 10A is a partial cutaway end perspective view of a housing member with a screen roller and another sliding linkage mechanism according to exemplary embodiments of the present invention.
FIG. 10B is an enlarged end view of the end portion of the linkage and sliding pivot pin according to exemplary embodiments of the present invention.

FIGS. 10A and 10B illustrate that link 47 can also be configured to slidably move in a vertically extending housing channel 160ch in housing member 24. As shown, a sliding pin 160 snugly holds the link 47 captured in the channel 160ch in the housing member 24 while allowing the link 47 to pivot to open and close. Although not shown, when folded or collapsed for storage, the left-hand links 44, 48 can reside proximate the channel outer wall 150ch overlying each other and the right-hand links 43, 47 can reside proximate the other sliding channel 160ch.

Figure 12A:
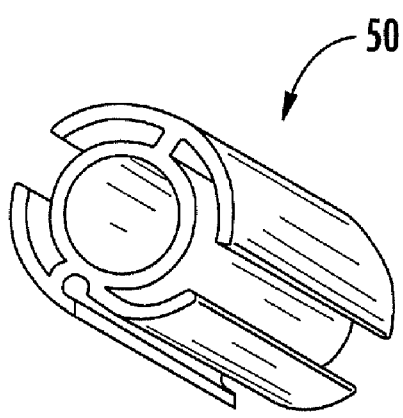
FIG. 12A is a side perspective view of a roller according to exemplary embodiments of the present invention.
Figure 12B:
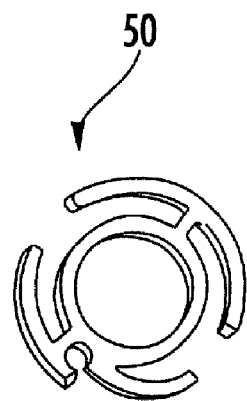
FIG. 12B is an end view of the roller shown in FIG. 12A.

FIG. 11 is a partial cutaway side perspective view of the housing member 22 with the roller 50. The roller 50 can be spring-loaded as a conventional take-up reel to hold the screen 30 as is known to those of skill in the art. As previously discussed, the housing member 22 can include a top end cap assembly 122 which holds the roller 50 in the housing member 22 and attaches the link 43 to the housing 22 using the pivot pin 143. The roller 50 can be held by a roller cap 50c and a spring retainer 52. FIGS. 12A and 12B illustrate an exemplary roller configuration that can hold the flexible screen 30. The roller 50 and screen 30 can be modularly configured to allow for screen 30 upgrades.

Referring again to FIG. 11, each housing member 22, 24 can also include a lower end cap assembly 222 that can be configured to automatically slide the foot 70 from a recessed stored configuration to an outwardly extended "use" configuration as will be discussed further below. Each foot 70 may be spring-loaded in the respective housing member 22, 24 to allow for some vertical float when extended.

Figure 13:
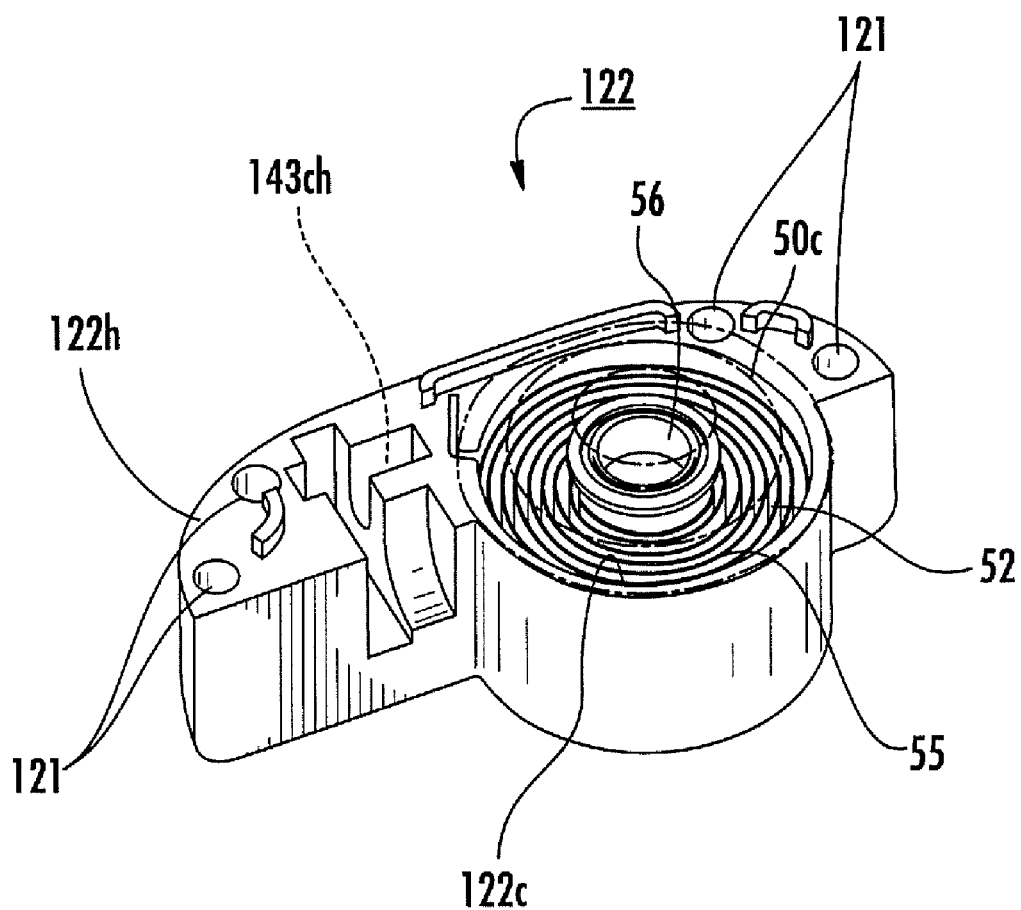
FIG. 13 is an enlarged bottom perspective view of a spiral spring assembly according to exemplary embodiments of the present invention.

FIG. 13 illustrates the top end cap assembly 122. As shown, the end cap housing 122h includes a pin channel 143ch for pin 143 and attachment channels 121 for accepting mounting pins that hold the end cap 122 to the housing 22. The end cap housing 122h also includes a roller cavity 122c for holding a spiral spring 55, a spring retainer 52, a bearing 56 and roller cap 50c therein.

Figure 14:
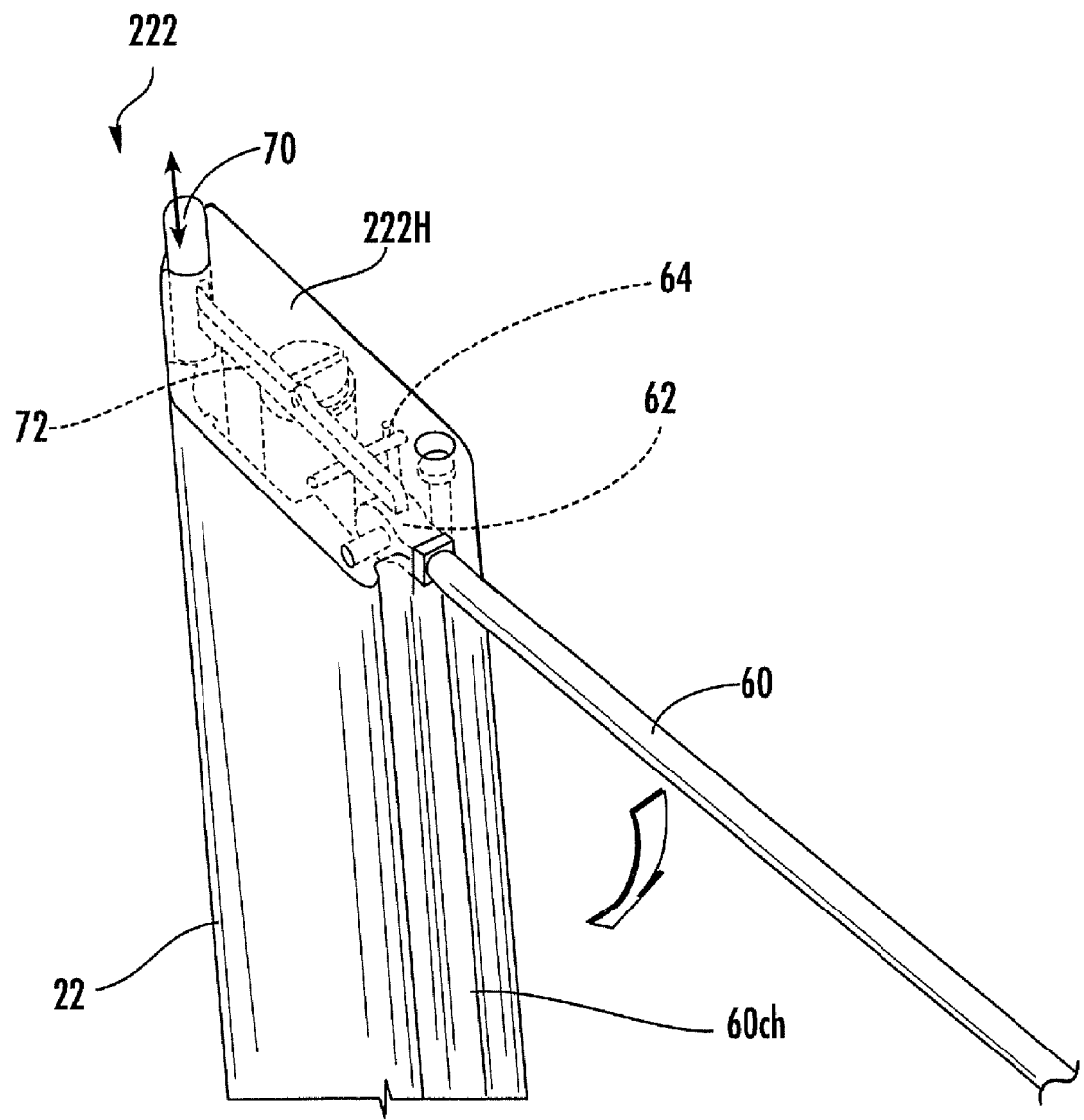
FIG. 14 is a partial end perspective view of a (spring) side assembly according to exemplary embodiments of the present invention.
Figure 15:
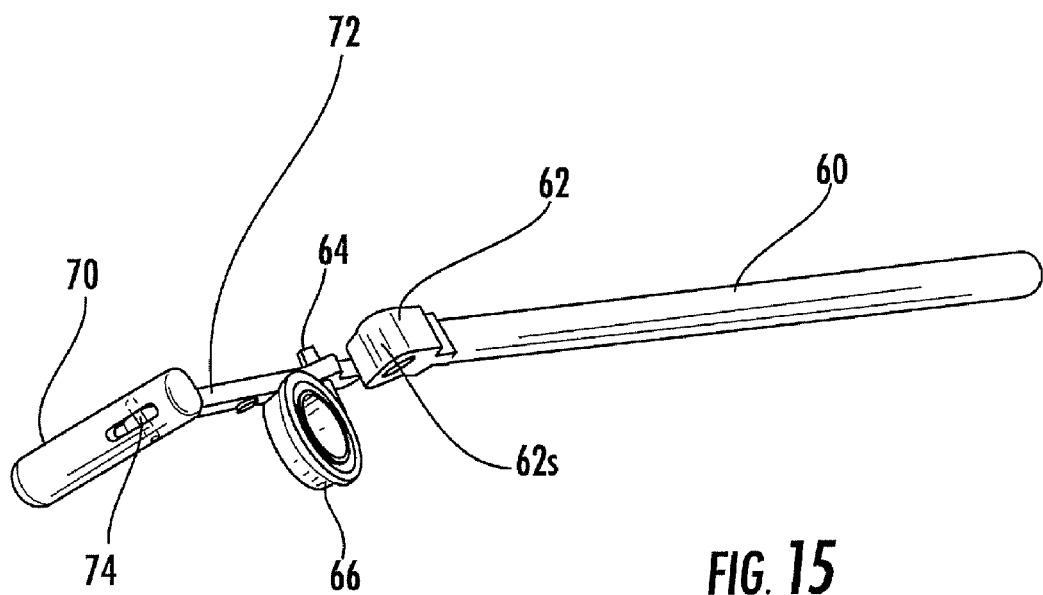
FIG. 15 is a side perspective view of an end cap and leg assembly according to exemplary embodiments of the present invention.
Figure 16A:
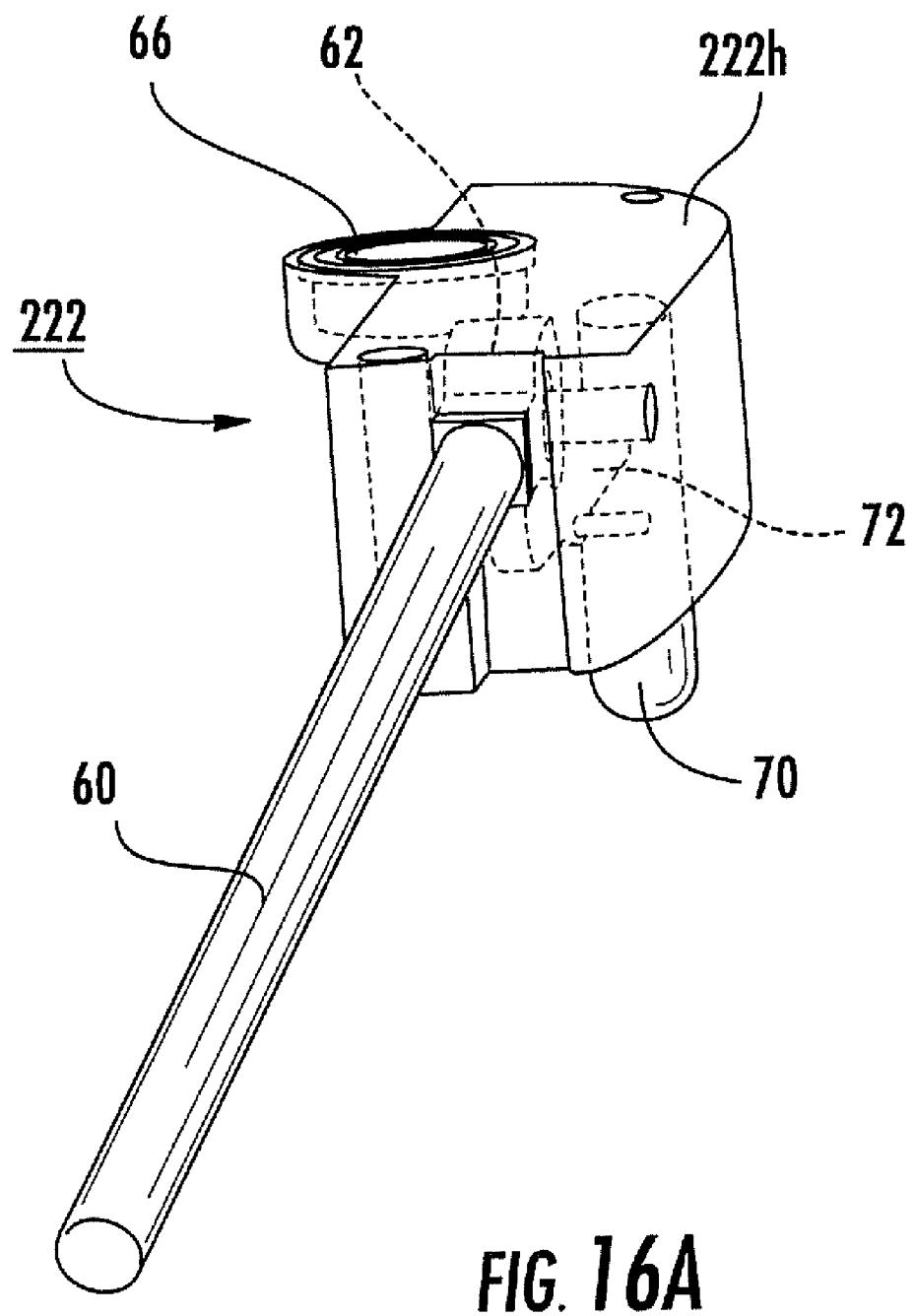
FIG. 16A is an end perspective view of the end cap and leg assembly shown in FIG. 15.
Figure 16B:
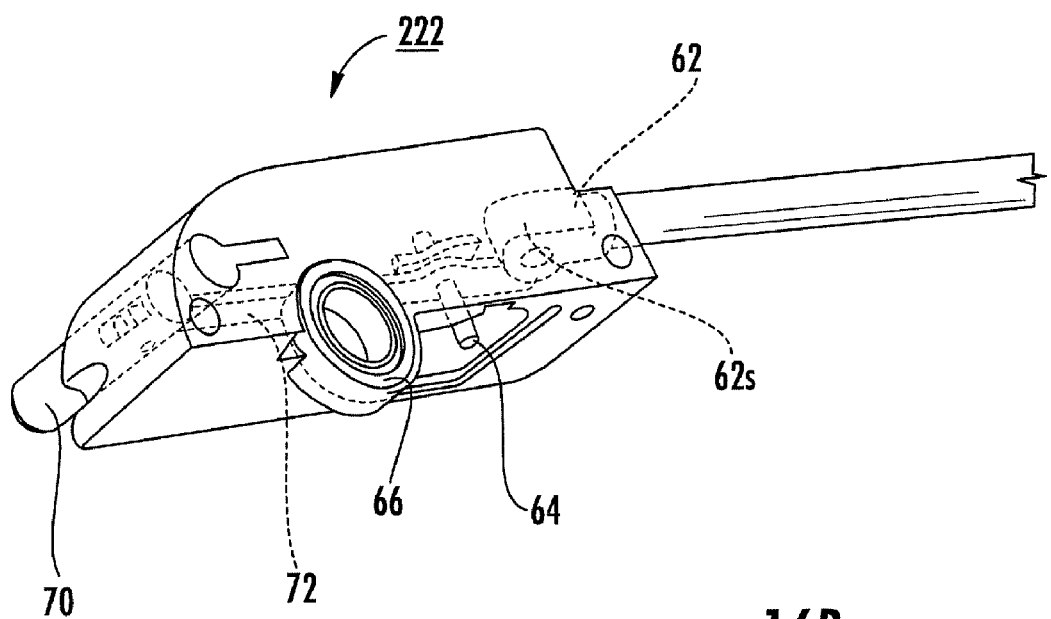
FIG. 16B is a side perspective view of the end cap and leg assembly shown in FIG. 15.

FIG. 14 illustrates the lower end cap assembly 222, with the bottom end of the housing 222h shown transparent to illustrate components held therein. As shown, the assembly 222 includes the vertically sliding foot 70 and the rotatable leg 60. The assembly 222 also includes a (cantilevered) leg lever 72 that extends from the leg 60 to the foot 70. A laterally extending link or pin 64 holds the lever 72 in position. A leg cam 62 is in communication with the leg 60 and the leg lever 72. Referring to FIGS. 15, 16A and 16B, one end portion of the leg lever 72 is attached to the sliding foot 70 and the other end of the leg lever 72 is in communication with the 62s surface of the leg cam 62. Rotation of the leg 60 to an operative outwardly extended position rotates the cam surface 62s of the cam 62, which forces the lever 72 to push the foot 70 to slide down and out of the housing 222h. Similarly, rotation of the leg 60 back to a storage configuration rotates the cam surface 62s, which, in turn, forces the foot 70 to slide up into the housing 222h. Although not shown, the other end cap assembly 224 can be configured to operate similar to the leg and foot mechanism described with respect to end cap assembly 222, without requiring the bearing 66 that communicates with the roller 50.

Figure 17A:
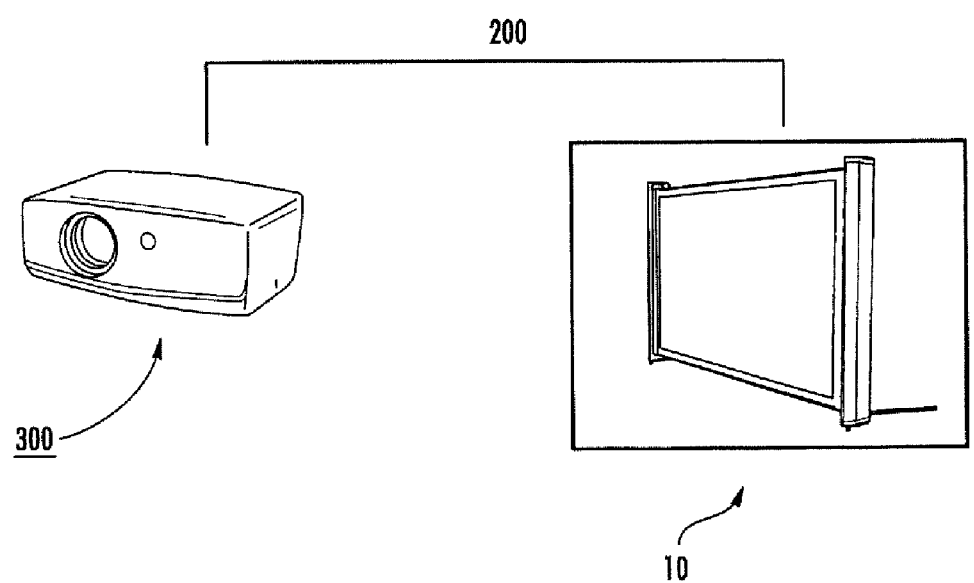
FIG. 17A is a schematic illustration of a low-lumen projector system with a projector screen assembly according to embodiments of the present invention.
Figure 17B:
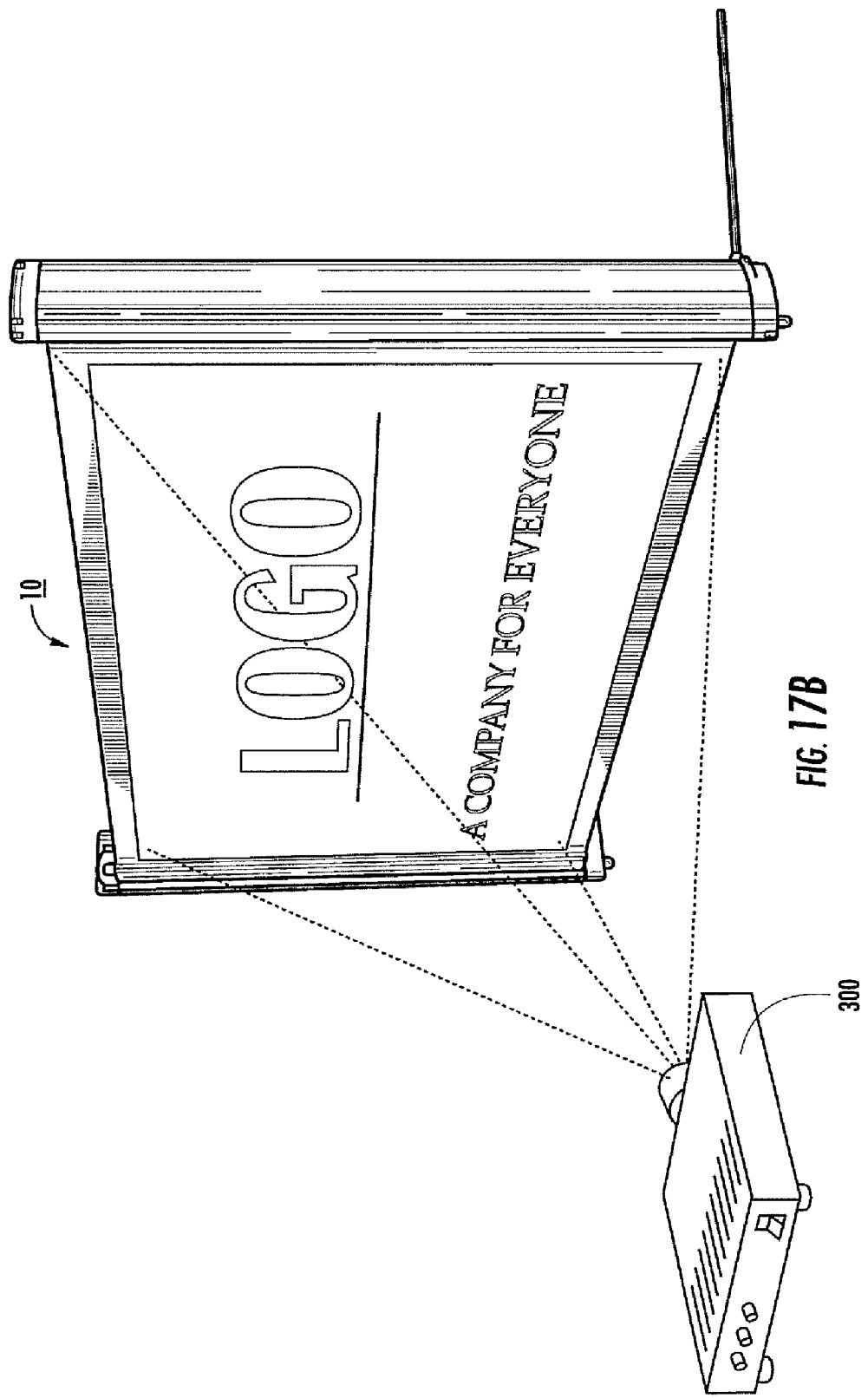
FIG. 17B is a front perspective illustration of a projector and screen in a use orientation.

FIG. 17A illustrates that, in some embodiments, a low-lumen projection system 200 can be provided. The system 200 can include a portable screen 10 and a low-lumen projector 300. The low-lumen projector 300 can be a light-weight battery powered DLP/LED projector 300. FIG. 17B illustrates a portable projector in communication with the screen 30.

As described above, embodiments of the invention are directed to projector screens that are suitable for use in mixed ambient light conditions. In most homes, conference rooms, classrooms or offices, the rooms are lit with combinations of general lighting (overhead fixtures, sconces), task lighting (lamps, under-cabinet illumination) and accent lighting. Task and accent lighting dominates over general lighting. Projectors tend to be used in rooms that have more task and accent lighting—living rooms, dens, and family rooms. For the most part painted ceilings are painted shades of white that produces a slight bias to ambient illumination impinging from above. In office buildings and schools general lighting tends to prevail in the form of ceiling-mounted fluorescent units. Typically, in homes and business, light signals range from about 50 lux (a darkish living room corner) to about 550 lux—a bright window-lit office and all points in between.

The maximum illuminance of a projection screen 30 is dependent on the luminance of the projector, the size of the projected image and the gain of the screen. Table 1 below shows examples of illumination that will be reflected when various size projection screens are illuminated with the luminous output of projectors of varying brightness. Signals that are between 200 and 1000 NITs (shown emphasized in Tables 1 and 2) are those that can be seen in a lit indoor room. Table 1 illustrates that low luminance projectors with low-gain screens are problematic for use in brightly lit rooms.

TABLE 1

Projection Screen Illuminance (Gain 1)

| Diagonal (4:3)″ | Projector Output (Øv) | | | | | |
|---|---|---|---|---|---|---|
| | 25 | 50 | 100 | 500 | 1000 | 1500 |
| 20 | 64.24 | 128.48 | 256.97 | 1284.85 | 2569.69 | 3854.54 |
| 30 | 28.55 | 57.10 | 114.21 | 571.04 | 1142.09 | 1713.13 |
| 40 | 16.06 | 32.12 | 64.24 | 321.21 | 642.42 | 963.64 |
| 50 | 10.28 | 20.56 | 41.12 | 205.58 | 411.15 | 616.73 |
| 60 | 7.14 | 14.28 | 28.55 | 142.76 | 285.52 | 428.28 |
| 70 | 5.24 | 10.49 | 20.98 | 104.89 | 209.77 | 314.66 |
| 80 | 4.02 | 8.03 | 16.06 | 80.30 | 160.61 | 240.91 |
| 90 | 3.17 | 6.34 | 12.69 | 63.45 | 126.90 | 190.35 |
| 100 | 2.57 | 5.14 | 10.28 | 51.39 | 102.79 | 154.18 |

For projection screens, gain can be particularly important in uncontrolled light viewing environments because sufficient gain can allow almost any projector to achieve on-axis luminance that exceeds the on-axis output of most other display systems. The highlighted regions of Tables 1 and 2 show the luminance-gain combinations projector and screen that deliver image illumination equivalent or superior to the image illumination of other popular display technologies (LCD, Plasma, rear-projection TV, CRT).

TABLE 2

Gain-Adjusted Luminance of projection Screens (Gains 3, 5 and 7)

Gain = 3

| Diagonal (4:3)″ | Projector Output (Øv) | | | | | |
|---|---|---|---|---|---|---|
| | 25 | 50 | 100 | 500 | 1000 | 1500 |
| 20 | 192.73 | 385.45 | 770.91 | 3854.54 | 7709.08 | 11563.62 |
| 30 | 85.66 | 171.31 | 342.63 | 1713.13 | 3426.26 | 5139.39 |
| 40 | 48.18 | 96.36 | 192.73 | 963.64 | 1927.27 | 2890.91 |
| 50 | 30.84 | 61.67 | 123.35 | 616.73 | 1233.45 | 1850.18 |
| 60 | 21.41 | 42.83 | 85.66 | 428.28 | 856.56 | 1284.85 |
| 70 | 15.73 | 31.47 | 62.93 | 314.66 | 629.31 | 943.97 |
| 80 | 12.05 | 24.09 | 48.18 | 240.91 | 481.82 | 722.73 |
| 90 | 9.52 | 19.03 | 38.07 | 190.35 | 380.70 | 571.04 |
| 100 | 7.71 | 15.42 | 30.84 | 154.18 | 308.36 | 462.54 |

TABLE 2-continued

Gain-Adjusted Luminance of projection Screens (Gains 3, 5 and 7)

Gain = 5

| Diagonal (4:3)″ | Projector Output (Øv) | | | | | |
|---|---|---|---|---|---|---|
| | 25 | 50 | 100 | 500 | 1000 | 1500 |
| 20 | 321.21 | 642.42 | 1284.85 | 6424.24 | 12848.47 | 19272.71 |
| 30 | 142.76 | 285.52 | 571.04 | 2855.22 | 5710.43 | 8565.65 |
| 40 | 80.30 | 160.61 | 321.21 | 1606.06 | 3212.12 | 4818.18 |
| 50 | 51.39 | 102.79 | 205.58 | 1027.88 | 2055.76 | 3083.63 |
| 60 | 35.69 | 71.38 | 142.76 | 713.80 | 1427.61 | 2141.41 |
| 70 | 26.22 | 52.44 | 104.89 | 524.43 | 1048.85 | 1573.28 |
| 80 | 20.08 | 40.15 | 80.30 | 401.51 | 803.03 | 1204.54 |
| 90 | 15.86 | 31.72 | 63.45 | 317.25 | 634.49 | 951.74 |
| 100 | 12.85 | 25.70 | 51.39 | 256.97 | 513.94 | 770.91 |

Gain = 7

| Diagonal (4:3)″ | Projector Output (LØv) | | | | | |
|---|---|---|---|---|---|---|
| | 25 | 50 | 100 | 500 | 1000 | 1500 |
| 20 | 449.70 | 899.39 | 1798.79 | 8993.93 | 17987.86 | 26981.79 |
| 30 | 199.87 | 399.73 | 799.46 | 3997.30 | 7994.60 | 11991.91 |
| 40 | 112.42 | 224.85 | 449.70 | 2248.48 | 4496.97 | 6745.45 |
| 50 | 71.95 | 143.90 | 287.81 | 1439.03 | 2878.06 | 4317.09 |
| 60 | 49.97 | 99.93 | 199.87 | 999.33 | 1998.65 | 2997.98 |
| 70 | 36.71 | 73.42 | 146.84 | 734.20 | 1468.40 | 2202.60 |
| 80 | 28.11 | 56.21 | 112.42 | 562.12 | 1124.24 | 1686.36 |
| 90 | 22.21 | 44.41 | 88.83 | 444.14 | 888.29 | 1332.43 |
| 100 | 17.99 | 35.98 | 71.95 | 359.76 | 719.51 | 1079.27 |

In the same way that a laptop computer screen has a narrower vertical region to accommodate a dimmer, lower-power backlight, high-gain projection screens can harvest light from the edges of the viewing field and concentrate it in the center of the viewing field. The tradeoff is that the image becomes dimmer as the viewer moves off axis.

In some embodiments, the projector screens 30 can comprise a film or a flexible thin substrate, alone, laminated or otherwise attached and/or combined with a second material. The viewing surface 30v can include arrays of miniaturized lenses that provide high-gain in low light or ambient light conditions. The lenses can be microlenses that create light distribution using aspheric, astigmatic, cylindrical and/or other precision-shaped patterns of lenses.

In some embodiments of the present invention, the refractive layer comprises an array of anamorphic lenses. The spatial frequency of the reflective layer can be higher than the spatial frequency of the refractive layer. In other embodiments, however, this relationship may be reversed, as long as the first and second spatial frequencies are different from one another. For additional exemplary screen materials and configurations, see, co-pending co-assigned U.S. patent application Ser. No. 11/179,162, the contents of which are hereby incorporated by reference as if recited in full herein.

Although specific embodiments of the present invention have been disclosed for illustrative purposes, those skilled in the art will appreciate that various modifications, additions and substitutions are possible, without departing from the scope and spirit of the invention as disclosed in the accompanying claims.

That which is claimed is:

1. A portable projection screen assembly, comprising:
a first housing member comprising a roller oriented in a substantially vertical orientation in the first housing member;
a flexible projection screen with a high gain and a high Ambient Rejection Ratio (ARR), wherein the screen is configured to roll onto and unroll from the roller;
a second housing member attached to one vertically extending end portion of the projection screen and releasably matably attached to the first housing member; and
a collapsible frame attached to the first and second housing members whereby the first and second housing members and the frame laterally slide between a closed storage configuration and at least one open viewing configuration, wherein the collapsible frame includes a first linkage pair with first and second links pivotably attached to each other and a second linkage pair with first and second links pivotably attached to each other, with the first link of each linkage pair attached to the first housing member and the second link of each linkage pair attached to the second housing member,
wherein, in the storage configuration, the projection screen is wound on the roller and the first and second members are closed together with the frame collapsed and held therebetween, and wherein, in the at least one open viewing configuration, the first and second housing members are laterally spaced apart with the projection screen and frame extending therebetween and the frame residing behind the projection screen.

2. A portable projection screen assembly according to claim 1, further comprising first and second spring-loaded feet extending vertically downward from a lowermost portion of the first and second housing members and out of windows in the housing members.

3. A portable projection screen assembly according to claim 1, wherein the first link of the first linkage pair is pivotably attached to a top portion of the first housing member and the second link of the first linkage pair is attached to a top portion of the second housing member,
wherein the first link of the second linkage pair has an end portion that is slidably attached to a channel in the first housing member and the second link of the second linkage pair has an end portion that is slidably attached to a channel in the second housing member so that each link of the second linkage pair is able to translate up and down in the respective housing member channel in response to opening and closing of the screen assembly, and
wherein the first and second pairs of linkages translate between a collapsed configuration when the first and second housing members are in the storage configuration to a laterally extended configuration in response to translation of the first and second housing members to the at least one viewing configuration.

4. A portable projection screen assembly according to claim 1, wherein the second pair of linkages is closely spaced to and overlies the first pair of linkages with the first and second links of the first linkage pair define a V-shape when the screen assembly is open, and the first and second links of the second linkage pair define a mirror image of the V-shape with a peak thereof residing at a top medial portion of the screen when the screen is open.

5. A portable projection screen assembly according to claim 1, wherein the first pair of linkages comprises a left link pivotably attached to a right link, and wherein an outermost end portion of the right link and an outermost end portion of the left link is pivotably attached to an upper portion of a corresponding one of the first and second housing members, and wherein the second pair of linkages comprises a left link pivotably attached to a right link with an outermost end portion of the right link and an outermost end portion of the left link attached to a corresponding one of the first and second housing members such that the outermost end portions of the right and left links of the second pair of linkages slide vertically in a respective housing channel in the first and second housing members as the first and second housing members open and close.

6. A portable projection screen assembly according to claim 1, wherein, in the storage configuration, the first housing member matably engages the second housing member to totally encase the screen and frame therebetween, and wherein the storage configuration defines a low-profile compact shape with a height dimension of less than about 2 inches, and wherein the screen assembly has a weight of between about 8-24 ounces.

7. A portable projection screen assembly according to claim 1, wherein the at least one viewing configuration comprises at least first and second pre-defined viewing configurations each having a different aspect ratio, and wherein the first and second housing members and at least one of the first and second links associated with the second linkage pair of the frame are configured to cooperate to open the projection screen to the first viewing configuration whereby a stop is automatically slidably engaged which inhibits further movement.

8. A portable projection screen assembly according to claim 7, wherein one of the first and second housing members has an externally accessible release that is in communication with the stop that allows a user to release the stop and open the screen to the second predetermined viewing configuration.

9. A portable projection screen assembly according to claim 7, wherein the first and second viewing configurations provide a 4:3 and 16:9 aspect ratio, respectively.

10. A portable projection screen assembly according to claim 1, wherein in the closed storage configuration, the first and second housing members have length×width×height measurements of about 15 in×2 in×1 in, and wherein, in at least one of the at least one viewing configurations the screen has a diagonal screen size of about 30 inches.

11. A portable projection screen assembly according to claim 1, wherein in the closed storage configuration, the first and second housing members have length×width×height measurements of about 24 in×3 in×0.5 in, and wherein, in at least one of the at least one viewing configurations the screen has a diagonal screen size of about 50 inches.

12. A portable projection screen assembly according to claim 1, wherein the projection screen is held laterally extended in tension in the at least one viewing configuration, and wherein the projection screen is a high-contrast and high-gain screen.

13. A portable projection screen assembly according to claim 1, wherein the second housing member comprises a plurality of vertically spaced apart apertures, wherein a first end portion of the second link of the second linkage pair is pivotably attached to an end portion of the first link of the second linkage pair, and wherein the second portion of the second link comprises a pin that extends substantially orthogonal to a lengthwise axis of the second link with a spring that resides on a primaly surface of the second link over the pin, the pin and spring configured to slide in the housing channel to hold allow the second link to pivot and translate up and down, and wherein the spring has an outwardly extending lobe that is configured to exit one of the apertures to hold the screen to a predefined viewing configuration.

14. A portable projection screen assembly, comprising:
a first housing member comprising a roller oriented in a substantially vertical orientation in the first housing member;
a flexible projection screen with a high gain and a high Ambient Rejection Ratio (ARR), wherein the screen is configured to roll onto and unroll from the roller;
a second housing member attached to one vertically extending end portion of the projection screen and releasably matably attached to the first housing member;
a collapsible frame attached to the first and second housing members whereby the first and second housing members and the frame laterally slide between a closed storage configuration and at least one open viewing configuration, wherein, in the storage configuration, the projection screen is wound on the roller and the first and second members are closed together in abutting contact with the frame collapsed and held therebetween, and wherein, in the at least one open viewing configuration, the first and second housing members are laterally spaced apart with the projection screen and frame extending therebetween and the frame residing behind the projection screen; and
first and second outwardly extendable legs, each attached to a corresponding one of the first and second housing members, wherein each of the legs is configured to rotate outwardly from a stored position adjacent the corresponding housing member to an operative screen support position, and wherein the first and second legs are attached to a respective lower rear portion of the corresponding first and second housing members and, wherein, when in the operative support position, the legs slope downwardly and extend in a single direction, rearwardly, to a support surface in an orientation that is substantially normal to a viewing surface of the projection screen.

15. A portable projection screen assembly, comprising:
a first housing member comprising a roller oriented in a substantially vertical orientation in the first housing member;
a flexible projection screen with a high gain and a high Ambient Rejection Ratio (ARR), wherein the screen is configured to roll onto and unroll from the roller;
a second housing member attached to one vertically extending end portion of the projection screen and releasably matably attached to the first housing member;
a collapsible frame attached to the first and second housing members whereby the first and second housing members and the frame laterally slide between a closed storage configuration and at least one open viewing configuration, wherein, in the storage configuration, the projection screen is wound on the roller and the first and second members are closed together with the frame collapsed and held therebetween, and wherein, in the at least one open viewing configuration, the first and second housing members are laterally spaced apart with the projection screen and frame extending therebetween and the frame residing behind the projection screen;
first and second outwardly extendable legs, each pivotally attached to a corresponding one of the first and second housing members, wherein the legs are configured to rotate outwardly from a stored position adjacent a corresponding one of the first and second housing members to an operative screen support position; and
a first foot in communication with the first leg in the first housing member and a second foot in communication with the second leg in the second housing member, each foot configured to slidably extend out of a lowermost portion of the respective first and second housing member,
wherein outward rotation of the first leg causes the first foot to extend vertically downward from a recessed storage configuration to an extended use position with a lower portion of the foot extending downwardly out of the first housing member, and wherein outward rotation of the second leg causes the second foot to extend vertically downward from a recessed storage configuration to an extended use position with a lower portion of the foot extending downwardly out of the second housing member.

16. A portable projection screen assembly comprising:
a first housing member comprising a roller oriented in a substantially vertical orientation in the first housing member;
a flexible projection screen with a high gain and a high Ambient Rejection Ratio (ARR), wherein the screen is configured to roll onto and unroll from the roller;
a second housing member attached to one vertically extending end portion of the projection screen and releasably matably attached to the first housing member; and
a collapsible frame attached to the first and second housing members whereby the first and second housing members and the frame laterally slide between a closed storage configuration and at least one open viewing configuration, wherein, in the storage configuration, the projection screen is wound on the roller and the first and second members are closed together with the frame collapsed and held therebetween, and wherein, in the at least one open viewing configuration, the first and second housing members are laterally spaced apart with the projection screen and frame extending therebetween and the frame residing behind the projection screen,
wherein the frame comprises a first pair of linkages pivotably attached to each other, and a second pair of linkages pivotably attached to each other, wherein the first and second pairs of linkages translate between a collapsed configuration when the first and second housing members are in the storage configuration to a laterally extended configuration in response to translation of the first and second housing members to the at least one viewing configuration,
wherein the first pair of linkages comprises a left link pivotably attached to a right link, and wherein an outermost end portion of the right link and an outermost end portion of the left link is pivotably attached to an upper portion of a corresponding one of the first and second housing members, and wherein the second pair of linkages comprises a left link pivotably attached to a right link with an outermost end portion of the right link and an outermost end portion of the left link attached to a corresponding one of the first and second housing members such that the outermost end portions of the right and left links of the second pair of linkages slide vertically in a respective housing channel in the first and second housing members as the first and second housing members open and close, wherein at least one of the outermost portions of the right and left links of the second pair of linkages slides in the respective channel until it engages a stop to lock the screen into position at one of two predetermined viewing configurations.

17. A ceiling or wall mountable projection screen assembly, comprising:
- a first housing member comprising a take-up reel oriented in a substantially vertical orientation in the first housing member;
- a flexible projection screen with a high Ambient Rejection Ratio (ARR) and a high gain, the projection screen having opposing first and second laterally spaced apart end portions with the first end portion engaging the take-up reel, wherein the screen is configured to roll on and unroll in a side-to side orientation from the take-up reel;
- a second housing member attached to the second end portion of the projection screen; and
- a collapsible frame attached to the first and second housing members whereby the first and second housing members laterally slide between a closed storage configuration and at least one open viewing configuration, wherein, in the storage configuration, the projection screen is wound on the take-up reel in the first member and the first and second members are closed together with the frame collapsed and held therebetween, and wherein, in the at least one open viewing configuration, the first and second housing members are laterally spaced apart with the projection screen extending therebetween and the frame residing behind the projection screen, wherein the collapsible frame includes a first linkage pair with first and second links pivotably attached to each other and a second linkage pair with first and second links pivotably attached to each other, with the first link of each linkage pair attached to the first housing member and the second link of each linkage pair attached to the second housing member.

18. A projection screen assembly according to claim 17 wherein the at least one viewing configuration comprises at least two pre-defined viewing configurations each having a different aspect ratio, and wherein the first and second housing members and the frame are configured to cooperate to open the projection screen to the first viewing configuration whereby a stop is automatically engaged which inhibits further movement.

19. A projection screen assembly according to claim 18, wherein the projection screen is held in tension in the at least one viewing configuration, and wherein the projection screen comprises a dense array of microlenses thereon.

20. A projection screen assembly according to claim 17, wherein the first and second pairs of linkages translate between a collapsed configuration when the first and second housing members are in the storage configuration to a laterally extended configuration in response to translation of the first and second housing members to the at least one viewing configuration,
wherein the first link of the first linkage pair is pivotably attached to a top portion of the first housing member and the second link of the first linkage pair is attached to a top portion of the second housing member, and
wherein the first link of the second linkage pair has an end portion that is slidably attached to a channel in the first housing member and the second link of the second linkage pair has an end portion that is slidably attached to a channel in the second housing member so that each link of the second linkage assemble is able to translate up and down in the respective housing member channel in response to opening and closing of the screen assembly.

21. A portable projection screen system, comprising:
a low-lumen projector; and
a case comprising a flexible projector screen held on a roller, the screen having a high ARR and being adapted for use in uncontrolled indoor ambient lighting conditions, wherein the case is configured with releasably matable first and second housing members and a slidably collapsible frame that extends therebetween, wherein the first and second housing members and frame slide apart to open in a side-to-side orientation whereby the projector screen automatically unrolls with the movement of the frame and at least one of the first and second housing members to at least one predetermined viewing configuration, and wherein the first and second housing members and slidably collapsible frame and slidably close together whereby the projector screen is automatically rolled on to the roller and the first and second members hold the screen and frame therebetween,
wherein the frame includes a first linkage pair with first and second links pivotably attached to each other and a second linkage pair with first and second links pivotably attached to each other with the first link of each linkage pair attached to the first housing member and the second link of each linkage pair attached to the second housing member.

22. A system according to claim 21, wherein the first linkage pair defines a V-shape when the screen assembly is open, and the second linkage pair defines a mirror image of the V-shape of the first linkage pair with a peak thereof residing at a top medial portion of the screen when the screen is open.

23. A system according to claim 21, wherein the first link of the first linkage pair is pivotably attached to a top of the first housing member and the second link of the first linkage pair is attached to a top of the second housing member,
wherein the first link of the second linkage pair has an end portion that is slidably attached to a channel in the first housing member and the second link of the second linkage pair has an end portion that is slidably attached to a channel in the second housing member so that each link of the second linkage assembly is able to translate up and down in the respective housing member channel in response to opening and closing of the screen assembly.

* * * * *

UNITED STATES PATENT AND TRADEMARK OFFICE
CERTIFICATE OF CORRECTION

PATENT NO. : 7,489,444 B2
APPLICATION NO. : 11/961364
DATED : February 10, 2009
INVENTOR(S) : Adams et al.

It is certified that error appears in the above-identified patent and that said Letters Patent is hereby corrected as shown below:

On Title Page Item 56 Other Publications: Please correct "Nov. 16, 2007" to read -- Nov. 6, 2007 -- in the following Publication: "U.S. Appl. No. 29/297,173, filed Nov. 16, 2007, Douglas Adams et al."

Column 14, Claim 11, Line 54: Please correct "24 inx3 inx0.5 in"
to read -- 24in x 3in x 1.5 in --

Column 15, Claim 13, Line 3: Please correct "on a primaly"
to read -- on a primary --

Column 18, Claim 20, Line 10: Please correct "linkage assemble"
to read -- linkage assembly --

Column 18, Claim 21, Line 35: Please correct "each other with"
to read -- each other, with --

Signed and Sealed this

Seventh Day of April, 2009

JOHN DOLL
*Acting Director of the United States Patent and Trademark Office*